（12） United States Patent
Yamada et al.

(10) Patent No.: US 6,885,760 B2
(45) Date of Patent: Apr. 26, 2005

(54) METHOD FOR DETECTING A HUMAN FACE AND AN APPARATUS OF THE SAME

(75) Inventors: Shin Yamada, Kanagawa (JP); Ryuta Itoh, Tokyo (JP); Kenji Nagao, Kanagawa (JP); Masaki Souma, Kanagawa (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 678 days.

(21) Appl. No.: 09/770,639

(22) Filed: Jan. 29, 2001

(65) Prior Publication Data

US 2001/0036298 A1 Nov. 1, 2001

(30) Foreign Application Priority Data

Feb. 1, 2000 (JP) ........................................ 2000-023680

(51) Int. Cl.$^7$ ................................................. G06K 9/00
(52) U.S. Cl. ...................................... 382/118; 382/117
(58) Field of Search ................................. 382/103, 115, 382/117, 118, 170, 171, 224; 235/380, 382, 382.5; 340/5.53, 5.83; 902/2–6; 351/204; 514/210.1

(56) References Cited

U.S. PATENT DOCUMENTS

| | | | | |
|---|---|---|---|---|
| 5,450,504 A | * | 9/1995 | Calia | 382/118 |
| 5,781,650 A | * | 7/1998 | Lobo et al. | 382/118 |
| 5,859,921 A | * | 1/1999 | Suzuki | 382/118 |
| 6,251,891 B1 | * | 6/2001 | Nakagawa et al. | 514/210.1 |
| 6,307,954 B1 | * | 10/2001 | Suzaki | 382/117 |

FOREIGN PATENT DOCUMENTS

JP             7-311833           11/1995

OTHER PUBLICATIONS

English Language Abstract of JP 7–311833.

* cited by examiner

*Primary Examiner*—Vikkram Bali
(74) *Attorney, Agent, or Firm*—Greenblum & Bernstein, P.L.C.

(57) ABSTRACT

In an apparatus for detecting a human face from an input image, candidate areas for an eye and candidate areas for an interval between eyes are detected from the image, an area of the interval between eyes is determined from the positional relationship between the candidate areas for an eye and candidate area for an interval between eyes, and a face area is determined so that the face area includes the area of the interval between eyes.

19 Claims, 21 Drawing Sheets

METHOD FOR DETECTING A HUMAN FACE AND AN APPARATUS OF THE SAME

BACKGROUND OF THE INVENTION

1. Field of the Invention

The present invention relates to a technique for detecting an area of a human face and information on the face from an image, and pertains to a moving picture retrieval apparatus for retrieving a moving picture using the information on the human face and on the person as a key, to a monitoring system for monitoring a driver and passengers on a car, and to a face identifying system for identifying a face shot in a camera as a face on a database.

2. Description of the Related Art

A technique for detecting a human face has been developed conventionally, and for example, there is a face detecting apparatus disclosed in Japanese Laid Open Patent Publication HEI7-311833. A conventional face detecting apparatus will be explained below using FIG. 22.

Conventional face detecting apparatus 2220, where the attention is drawn to eyes and mouth, is comprised of three processing apparatuses, namely, area detecting apparatus 2221 that detects a luminance minimum point where the luminance becomes the lowest locally and a luminance changing point where the luminance increases and that fetches an area between the two points as an area of a structural element of the face, face candidate detecting apparatus 2222 that detects a face candidate from the size and positional relationship of the face structural elemental area, and face determining apparatus 2223 that examines the face candidate in detail to determine whether the face candidate is of the face.

First differentiation section 2201 calculates the first differentiation of an input image signal 2231 downwardly starting from an upper portion of the image to output a first differentiation signal 2232. Binary section 2202 performs the binary processing on the first differentiation signal 2232 with 0 to output a first differentiation binary signal 2233. Second differentiation section 2203 calculates the second differentiation of the input image signal 2231 to output a second differentiation signal 2234. Binary section 2204 performs the binary processing on the second differentiation signal 2234 to output a second differentiation binary signal 2235.

OR section 2205 calculates the OR of the first differentiation binary signal 2233 and the second differentiation binary signal 2235 to output to an eye-mouth first candidate signal 2236. Connected area feature vector calculating section 2206 receives as its inputs the eye-mouth first candidate signal 2236 and the input image signal 2231, and with respect to the eye-mouth first candidate signal 2236, detects the area value, centroid position, vertical and horizontal lengths, and area feature vectors such as the luminance average and variance of each area composing the connected areas to output as an area feature vector signal 2237.

Eye second candidate determining section 2207 receives the area feature vector signal 2237, examines the area value, vertical and horizontal lengths and the luminance average and variance of each area, and thereby determines an area likely of an eye in the areas to output as an eye second candidate signal 2238 including the feature vectors of the area. Similarly, mouth second candidate determining section 2208 receives the area feature vector signal 2237, examines the area value, vertical and horizontal lengths and the luminance average and variance of each area, and thereby determines an area likely of a mouth in the areas to output as a mouth second candidate signal 2239 including the feature vectors of the area.

Face candidate determining section 2209 selects two eye candidate areas from the eye second candidate signal and one mouth candidate area from the mouth second candidate signal so that all the areas do not overlap each other, examines the centroid position of each area, further examines all combinations of candidate groups with an arrangement likely of a face, and thereby outputs a face candidate signal 2240.

Face candidate area image fetching section 2210 fetches a candidate area at which a face exists to output as a face candidate image signal 2241, based on centroid positions of candidate areas for right and left eyes in the corresponding face candidate signal, using the Affine transformation. Face determining section 2211 calculates a distance between the face candidate image signal and a face standard pattern, and when the distance is less than a predetermined threshold, determines that a human face is shot in a place corresponding to the input signal, and outputs a position, size and angle where the face exists as a face signal 2242.

As described above, in the conventional technique, the processing is executed that detects a luminance minimum point where the luminance becomes the lowest locally and a luminance changing point where the luminance increases, fetches an area between the two points as a candidate area for an eye or mouth, detects eye candidates and mouth candidates from shape characteristics and luminance characteristics of those candidate areas, detects face candidates from the positional relationship between the eye candidates and mouth candidates, and that examines each face candidate in detail to determine whether or not the face candidate is of the face.

However, in the case of an image/picture with many backgrounds shot therein as well as a face, many luminance minimum points and many luminance changing points exist therein, and therefore the detection of many eye and mouth candidate areas provides a problem that a lot of incorrect detection occurs.

In the conventional technique, the eye candidates and mouth candidates are detected from the shape characteristics and luminance characteristics of the eye and mouth candidate areas. However, the shapes of the eyes and mouth largely change corresponding to personal differences and changes in expression, and therefore many background portions incorrectly detected as eye and/or mouth candidate areas remain as the eye and/or mouth candidates. Further, when face candidates are detected using the positional relationship between the eye candidates and mouth candidates, many background portions incorrectly detected remain as face candidates, which is remarkable in designing to detect faces in profile and on the tilt also. Percentages by which the incorrect detection is suppressed in the processing for examining face candidates in detail change depending on the algorithm and threshold of the processing for examining face candidates in detail. An algorithm is preferable that provides less background portions incorrectly detected as face candidates and a less calculation amount. The calculation amount rapidly increases in many algorithms.

Further, in the conventional technique, detecting a face where a mustache covers part of a mouth provides a problem that the mustache and mouth are incapable of being separated and thereby are not detected.

SUMMARY OF THE INVENTION

It is an object of the present invention to provide a detecting apparatus and method which are suitable to detect information on an area of a human face and so on, and which are capable of suppressing incorrect detection with a small calculation amount, even when there are changes in expression of the face including motions of an eye and mouth, and are variations in the face due to the presence or absence of a mustache and so on.

In the present invention, candidate areas for eyes and candidate areas for an interval between eyes are detected from an image, the interval between eyes is determined from the positional relationship between the candidate areas for eyes and candidate area for the interval between eyes, and a face area is determined so that the face area includes the interval between eyes.

It is thereby possible to detect the information on the area of a human face, because the interval between eyes has little variations due to changes in expression of the face and is spaced away from the mouth and mustache, and therefore is hardly affected by the changes in expression of the face including motions of an eye and mouth and variations in the face due to the presence or absence of a mustache and so on.

Further, it is possible to detect the information on the area of a human face and so on with a small calculation amount by first dividing the image into small areas to determine whether the small area is of an eye or of an interval between eyes, instead of determining whether a plurality of pixels is of connected areas.

Furthermore, it is possible to detect the area of a human face with high accuracy and with a small calculation amount, as well as in a case that many backgrounds are shot besides the face, by examining the overlap of the interval between eyes and judging features in the candidate areas for eyes and for the interval between eyes to determine the interval between eyes.

DETAILED DESCRIPTION OF THE PREFERRED EMBODIMENTS

Embodiments of the present invention will be described specifically below with reference to accompanying drawings.

(First Embodiment)

Figure 1:
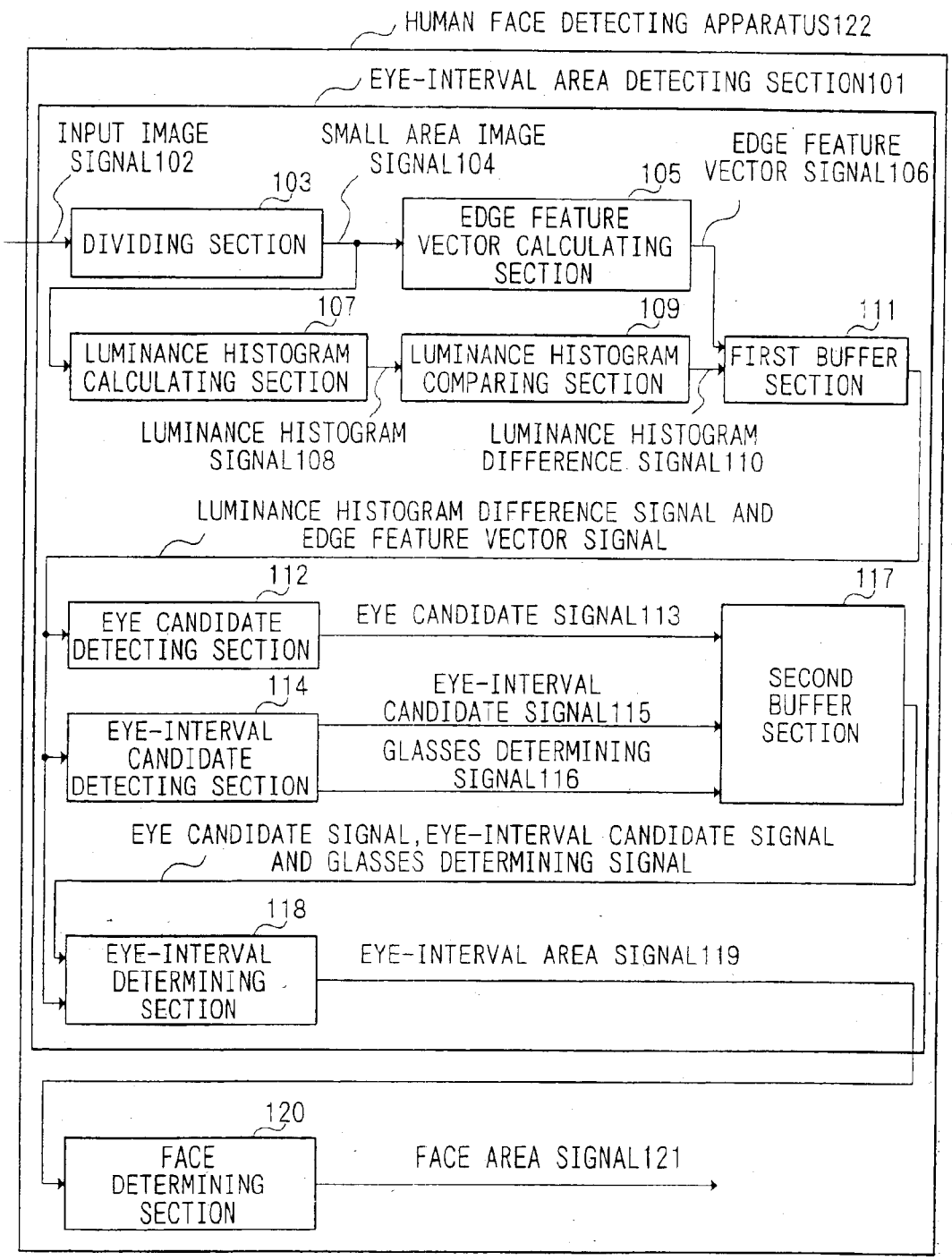
FIG. 1 is a diagram illustrating a schematic configuration of an apparatus for detecting a human face in a first embodiment of the present invention.

FIG. 1 is a diagram illustrating a schematic configuration of an apparatus for detecting a human face in the first embodiment of the present invention. In FIG. 1, an input image signal 102 input to human face detecting apparatus 122 is input to dividing section 103 of eye-interval area detecting section 101. Hereinafter, an interval between eyes is also referred to as an eye-interval.

Dividing section 103 divides the whole image of the input image signal 102 into a plurality of small areas, and sequentially outputs an image of each small area as a small area image signal 104.

Edge feature vector calculating section 105 reads the small area image signal 104, and outputs a sum total of edge intensities of each pixel in the small area as an edge feature vector signal 106.

Luminance histogram calculating section 107 reads the small area image signal 104, and outputs the histogram of pixels in the small area as a luminance histogram signal 108.

Luminance histogram comparing section 109 reads the luminance histogram signal 108, and outputs a difference of the luminance histogram between two small areas adjacent to each other in a horizontal direction as a luminance histogram difference signal 110.

First buffer section 111 stores the edge feature vector signals 106 and luminance histogram difference signals 110 of a plurality of small areas.

Eye candidate detecting section 112 reads out the edge feature vector signals 106 and luminance histogram difference signals 110 stored in first buffer section 111, detects a small area to be a candidate for an eye (eye candidate), and outputs coordinates of the small area to be the candidate for an eye as an eye candidate signal 113.

Eye-interval candidate detecting section 114 reads out the edge feature vector signals 106 and luminance histogram difference signals 110 stored in first buffer section 111, detects a small area to be a candidate for an interval between eyes (eye-interval candidate), and outputs an eye-interval candidate signal 115 indicative of coordinates of the small area to be the candidate for an interval between eyes and a glasses determining signal 116 indicative of the presence or absence of glasses.

Second buffer section 117 stores the eye candidate signal 113, eye-interval candidate signal 115 and glasses determining signal 116.

Eye-interval determining section 118 reads out the eye candidate signal 113, eye-interval candidate signal 115 and glasses determining signal 116 from second buffer section 117, further reads out the luminance histogram difference signal 110 from first buffer section 111 when necessary, examines whether an eye-interval candidate small area exists between two eye candidate small areas to determine an eye-interval area, and outputs coordinates of the eye-interval area as an eye-interval area signal 119.

Face determining section 120 reads the eye-interval area signal 119, and outputs a face area signal 121 indicative of coordinates of a face area.

In addition, human face detecting apparatus 122 in FIG. 1 may be achieved by a computer program for detecting a human face using a CPU and memory in a personal computer.

The operation of human face detecting apparatus 122 in FIG. 1 will be described below using the flowchart in FIG. 2.

Figure 3:
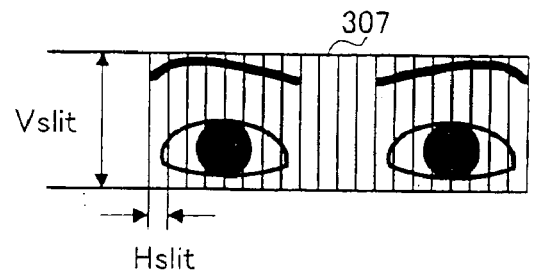
FIG. 3(a) is a view showing an example of a small area.
FIG. 3(b) is a view showing examples of a detected candidate area for a human face and of a detected candidate area for an interval between eyes.
FIG. 3(c) is a view showing examples of a detected area for a human face and of a detected area for the interval between eyes.
Figure 3:
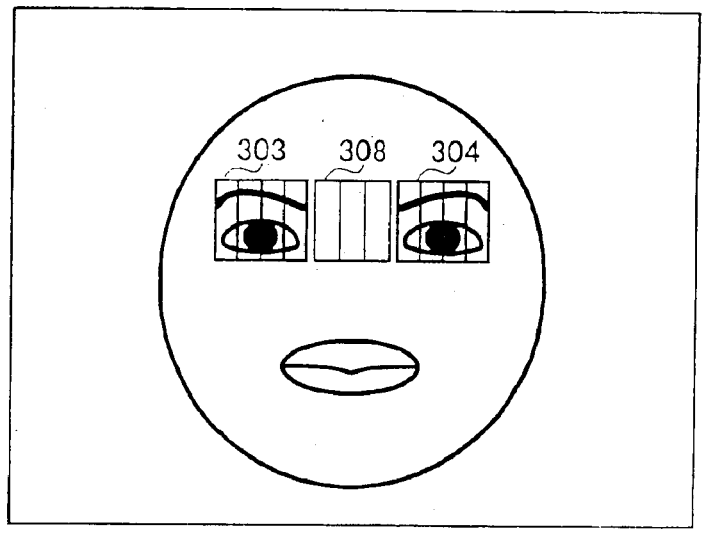
Figure 3:
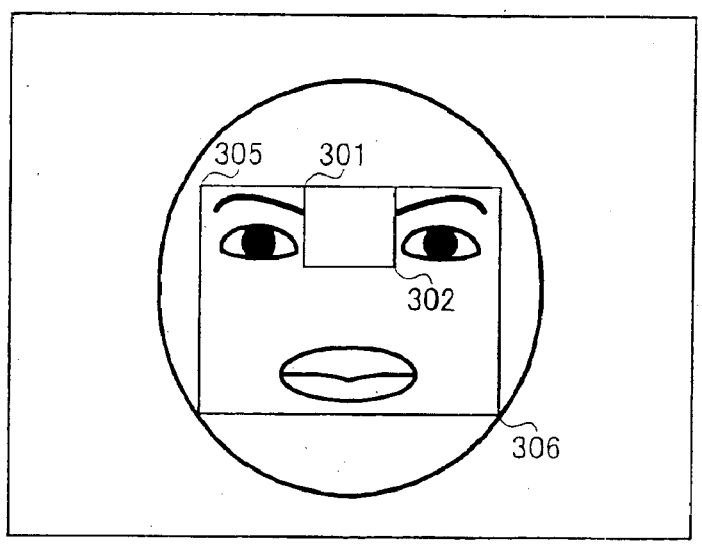

At step 201, dividing section 103 divides the whole image input by the input image signal 102 into small areas of a size of Vslit×Hslit (each of Vslit and Hslit is an integer equal to or more than 1), and sequentially outputs an image of each small area as the small area image signal 104. For example, as shown in FIG. 3(a), the small area is assumed to have Vslit=12 and Hslit=2 (each value of Vslit and Hslit is predetermined).

At step 202, edge feature vector calculating section 105 reads the small area image signal 104, and with respect to a pixel (x,y) in the small area, calculates a square Ve(x,y) of the vertical edge intensity, using the following equation, where each of x and y is an integer equal to or more than 1.

$$Ve(x,y)=[Y(x,y-1)-Y(x,y+1)]\times[Y(x,y-1)-Y(x,y+1)]$$

Sve(i,j) is defined as the sum total of Ve(x,y) in the small area (i,j) of the ith from the left side and of jth from the top (each of i and j is an integer equal to or more than 1). In addition, Y(x,y) is indicative of the luminance of pixel (x,y), and an integer ranging from 1 to 255. The total sum Sve(i,j) of the edge intensities of pixels in the small area (i,j) of the ith from the left side and of the jth from the top is output as the edge feature vector signal 106.

At step 203, luminance histogram calculating section 107 reads the small area image signal 104, and with respect to the pixel (x,y) in the small area (i,j), examines the frequency of the luminance value to generate the histogram H(i,j,bin). In addition, it is assumed in this embodiment to examine frequencies of values of three bits in descending order of significance to generate the histogram H(i,j,bin), where bin is an integer ranging from 1 to 8. The histogram H(i,j,bin) of pixels in the small area (i,j) of the ith from the left side and of the jth from the top is output as the luminance histogram signal 108.

At step 204, luminance histogram comparing section 109 reads the luminance histogram signal 108, and calculates a difference of the luminance histogram Dh(i,j) between two small areas (i,j) and (i−1,j) adjacent each other in the horizontal direction, using the following equation.

$$Dh(i,j)=\Sigma[[H(i,j,bin)-H(i-1,j,bin)]\times[H(i,j,bin)-H(i-1,j,bin)]]$$

The difference of the luminance histogram Dh(i,j) between the small area (i,j) of the ith from the left side and of the jth from the top and the small area (i−1,j) of the i−1th from the left side and of the jth from the top is output as the luminance histogram difference signal 110.

At step 205, first buffer section 111 stores the edge feature vector signals 106 and luminance histogram difference signals 110 of a plurality of small areas.

At step 206, since there are many segments in nearly-horizontal directions in an eye area, the edge feature vector signal Sve(i,j) is compared with a first threshold Th1. Then, a predetermined N1 or more number of small areas are selected each of which satisfies Sve(i,j)>Th1 and which are arranged successively in the horizontal direction. Further, since there are a few segments in nearly-vertical directions, with respect to the selected N1 or more small areas, each luminance histogram difference signal Dh(i,j) is compared with a second threshold Th2. Then, when each of a predetermined number N2 or more number of small areas in the selected N1 or more small areas satisfies Dh(i,j)<Th2, the selected N1 small areas are determined as an eye candidate. Then, the upper-left-coordinate of the small area at the left end of the eye candidate and the lower-right-coordinate of the small area at the right end of the eye candidate are output as the eye candidate 113.

At step 207, since there are a few segments in nearly-horizontal directions in an interval between eyes on a face with no glasses worn thereon, the edge feature vector signal Sve(i,j) is compared with a third threshold Th3. Then, a predetermined N3 or more number of small areas are selected each of which satisfies Sve(i,j)<Th3 and which are arranged successively in the horizontal direction. Further, since there are also a few segments in nearly-vertical directions, with respect to the selected N3 or more small areas, each luminance histogram difference signal Dh(i,j) is compared with a fourth threshold Th4. Then, when each of a predetermined number N4 or more number of small areas in the selected N3 or more small areas satisfies Dh(i,j)<Th4, the selected N3 small areas are determined as an eye-interval candidate. Then, the upper-left-coordinate of the small area at the left end of the eye-interval candidate and the lower-right-coordinate of the small area at the right end of the eye-interval candidate are output as the eye-interval candidate signal 115. Further, the glasses determining signal 116 corresponding to the eye-interval candidate signal is output as being indicative of "absence of glasses".

At step 208, since there are many segments in nearly-horizontal directions in an interval between eyes on a face with glasses worn thereon, the edge feature vector signal Sve(i,j) is compared with a fifth threshold Th5, and the edge feature vector signal Sve(i,j−1) is compared with a sixth threshold Th6. Then, a predetermined N5 or more number of pairs of small areas are selected each pair of which satisfies Sve(i,j)>Th5 and Sve(i,j−1)<Th6 and which pairs are arranged successively in the horizontal direction. Further, since there are a few segments in an area of a forehead, with respect to the selected N5 or more number of pairs of small areas, each luminance histogram difference signal Dh(i,j−1) is compared with a second threshold Th7. Then, when each of a predetermined number N6 or more number of small areas in the selected N5 or more number of pairs of small areas satisfies Dh(i,j−1)<Th7, a lower portion of the selected N5 pairs of small areas is determined as an eye-interval candidate. Then, the upper-left-coordinate of the small area at the left end of the eye-interval candidate and the lower-right-coordinate of the small area at the right end of the eye-interval candidate are output as the eye-interval candidate signal 115. Further, the glasses determining signal 116 corresponding to the eye-interval candidate signal is output as being indicative of "presence of glasses".

At step 209, second buffer section 117 stores the eye candidate signal 113, eye-interval candidate signal 115 and the glasses determining signal 116.

At step 210, eye-interval determining section 118 reads out the eye candidate signal 113 and eye-interval candidate signal 115 from second buffer section 117, and detects an eye-interval candidate provided between two eye candidates arranged in the horizontal direction.

When the glasses determining signal corresponding to the detected eye-interval candidate is indicative of "absence of glasses", the section 118 outputs the lower-right-coordinate in the eye candidate signal of the eye candidate at the left of the detected eye-interval candidate and the upper-left-coordinate in the eye candidate signal of the eye candidate at the right of the detected eye-interval candidate, as the eye-interval area signal 119. When the glasses determining signal corresponding to the detected eye-interval candidate is indicative of "presence of glasses", the section 118 selects, as an eye-interval candidate, an area provided between the lower-right-coordinate in the eye candidate signal of the eye candidate at the left of the detected eye-interval candidate and the upper-left-coordinate in the eye candidate signal of the eye candidate at the right of the detected eye-interval candidate, reads out the luminance histogram difference signal of each small area in the selected area from the first buffer section, and obtains the average of the read luminance histogram difference signals. When the average is equal to or more than a threshold Th8, the section 118 outputs the lower-right-coordinate in the eye candidate signal of the eye candidate at the left of the detected eye-interval candidate and the upper-left-coordinate in the eye candidate signal of the eye candidate at the right of the detected eye-interval candidate, as the eye-interval area signal 119.

At step 211, based on the coordinates (lower-right-coordinate and left-upper-coordinate of the eye-interval area) indicated by the eye-interval area signal 119, face determining section 120 determines coordinates of a face area according to a predetermined transformation equation to output as a face area signal 121.

Assuming that the upper-left-coordinate and lower-right-coordinate of the eye-interval area are respectively (xli,yti) and (xri,ybi), and that the upper-left-coordinate and lower-right-coordinate of the face area are respectively (xlf,ytf) and (xrf,ybf), for example, it is predetermined that the coordinates of the face area are obtained from the following equations.

$$xlf = xli - (xri - xli)$$

$$xrf = xri + (xri - xli)$$

$$ytf = yti$$

$$ybf = yti + (xrf - xlf)$$

As an example of detecting a human face in this example, FIG. 3(b) shows the eye candidate areas 303 and 304 and the eye-interval candidate area 308, while FIG. 3(c) shows the left-upper-coordinate 301 and the lower-right-coordinate 302 of the eye-interval area obtained from the eye-interval candidate area 308, and the left-upper-coordinate 305 and the lower-right-coordinate 306 of the face area.

While the whole image is divided into small areas in the above explanation, it may be possible to divide part of the image (expected as an area on which an eye-interval area exists) in to small areas. For example, when an eye-interval area is detected from a frame picture of telecast, a face is often present at an upper half of the picture, and therefore it may be possible to divide the upper half of the picture into small areas, and to detect an eye-interval area from the divided areas.

Further, while it is explained that the step 206 for detecting an eye candidate, and steps 207 and 208 for detecting an eye-interval candidate are executed sequentially in this order, it may be possible to execute the steps 206 to 208 concurrently or in any order.

It may be possible to calculate an edge intensity using another method that is generally known at the step 202. Further, it may be possible to calculate the sum total of absolute values of luminance differences instead of the sum total of squares of luminance differences.

Similarly, it may be possible to calculate a difference of luminance histogram using another method that is generally known at the step 204. Further, it may be possible to output the sum total of absolute values of frequency differences [H(i,j,bin)−H(i−1,j,bin)], instead of the sum total of squares of frequency differences, as a luminance histogram difference signal. It may be possible to examine the presence or absence of straight line and curved line using another feature vector, instead of using the edge intensity and luminance histogram difference, to detect eye candidates and eye-interval candidates.

It may be possible to detect eye candidates of a face with glasses by using another feature or combining a plurality of features. At the step 208 in this embodiment, the feature of a forehead portion (upper side of glasses) is used, however, it may be possible to use such a feature that there are a small number of lines (the edge intensity of each pixel is very small) at a nose portion (lower side of glasses).

Further, it may be possible to use the feature of histogram distribution of an interval between both eyes of a face with glasses (for example, such a feature that a difference of luminance histogram between small areas adjacent each other in the horizontal direction is large).

It may be possible to use another method as the method for determining a face area from an eye-interval area. For example, it may be possible to set a face candidate area in the vicinity of the eye-interval area, to fetch pixels of flesh-color in the face candidate area as flesh-colored pixels, and to obtain as a face area a rectangle area containing flesh-colored pixels whose ratio is more than a predetermined value.

According to this embodiment, since an eye-interval area is detected by using the features of both eyes and of the interval between the eyes, the eye-interval area is immune to a variation in face due to the expression of the face including mouth motions, presence or absence of mustache, and/or hairstyle, and therefore using the eye-interval enables an area of a human face to be detected.

In the eye area, edge intensities in the vertical direction have a large value not depending on a variation in face including eye and eyelid motions, presence or absence of glasses, and hairstyle, and pixels with almost the same luminance value adjoin each other in the horizontal direction. Therefore, it is possible to detect a candidate for an eye area not depending on the variation in face including eye and eyelid motions, presence or absence of glasses, and hairstyle. Further, an eye-interval candidate is detected by using both features of the eye-interval with glasses and of the eye-interval with no glasses, and thereby it is possible to detect a candidate for the eye-interval area not depending on the presence or absence of glasses. Furthermore, since an eye-interval varies little even if the expression of a face varies, it is possible to detect candidates for the eye-interval area not depending on the expression of the face. Moreover, the features of eyes and eye-interval used in this embodiment are held even if the head moves entirely and the direction and/or tilt of the face varies, and therefore it is possible to detect candidates for the eye-interval not depending on the head entirely moving. According to the foregoing, the apparatus for detecting a human face in this embodiment is capable of detecting an area of a human face not depending on a variation in face including movements of the eye, eyelid and the entire head, presence or absence of glasses, and hairstyle.

Further, since the apparatus first divides the whole image into small areas, and then determines whether the small area is of an eye or of an eye-interval, the apparatus does not need the processing requiring a large calculation amount such as the processing for determining whether a plurality of pixels is of connected areas, and therefore is capable of detecting an area of a human face with a small calculation amount.

In an apparatus and system that process moving pictures using the technique for detecting a human face, it is often required to detect an area of a human face with a small calculation amount and with high speed. According to this embodiment, the processing requiring a large calculation amount is not executed such as the processing for examining connected areas of an area provided between a luminance minimum point and a luminance changing point to detect candidate areas for an eye and mouth, and therefore it is possible to detect an area of a human face fast. Further, detecting an area of a human face enables the number of faces (people) in an image to be estimated readily.

Figure 2:
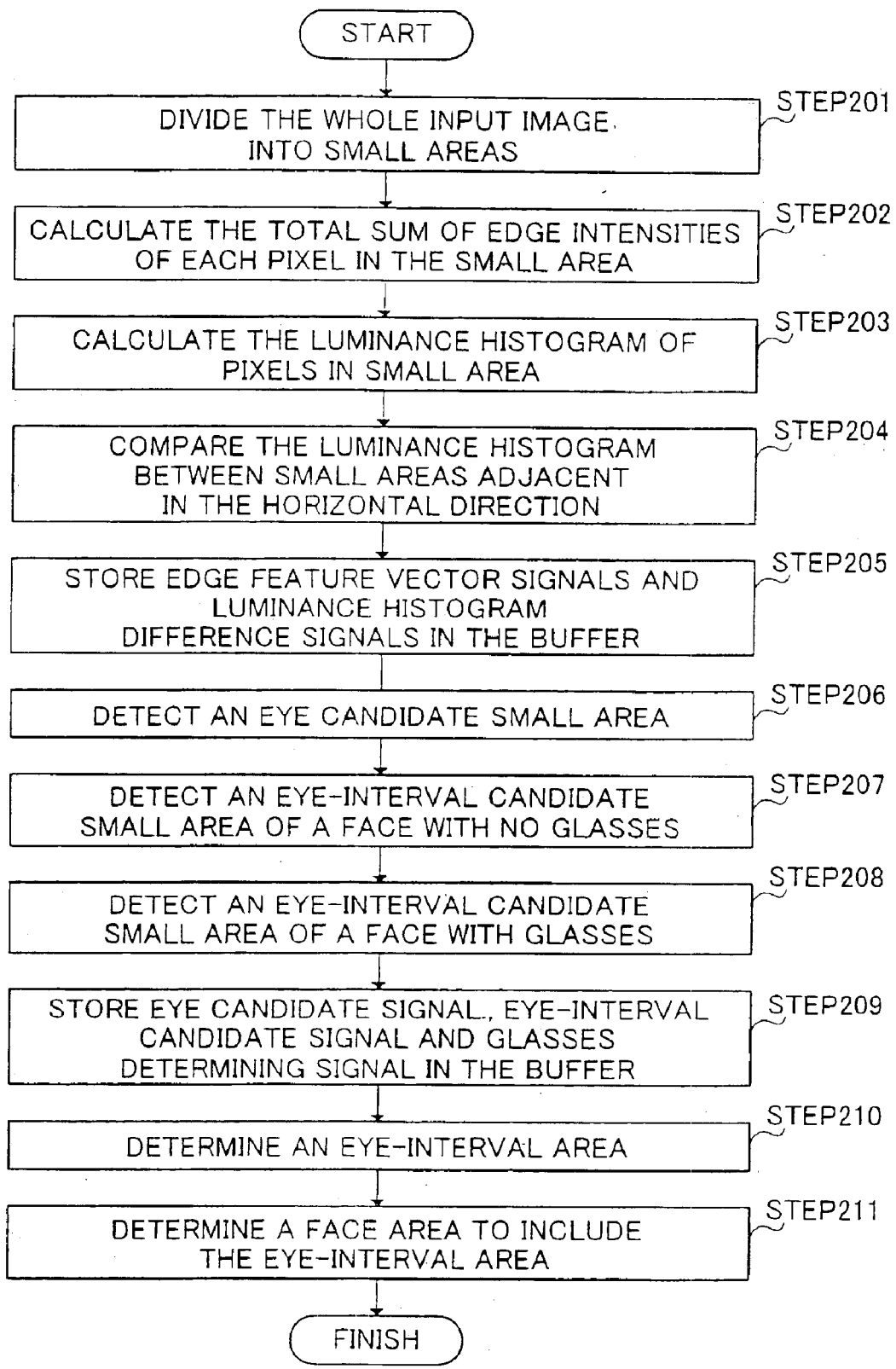
FIG. 2 is a flowchart indicating the operation of the apparatus for detecting a human face in the first embodiment of the present invention.

The processing procedures shown in FIG. 2 may be stored in a storage medium as a program for detecting a human face, whereby it is possible to install the program into various computers to execute the method for detecting a human face, and to detect an area of a human face from an image.

(Second Embodiment)

The second embodiment provides a more accurate apparatus for detecting a human face by combining two eye-interval area detecting sections 101 explained in the first embodiment.

Figure 4:
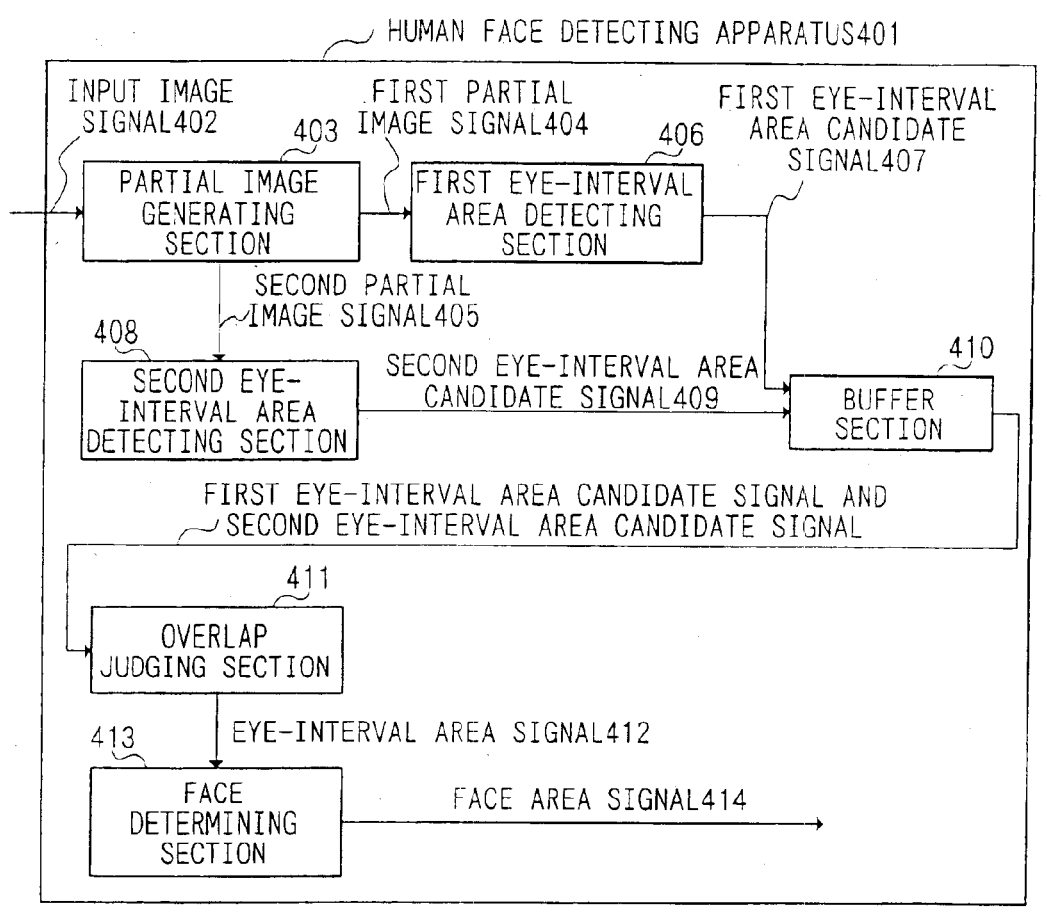
FIG. 4 is a diagram illustrating a schematic configuration of an apparatus for detecting a human face in a second embodiment of the present invention.

FIG. 4 is a diagram illustrating a schematic configuration of the apparatus for detecting a human face in the second embodiment of the present invention. In FIG. 4, in human face detecting apparatus 401, an input image signal 402 is input to partial image generating section 403.

Figure 5:
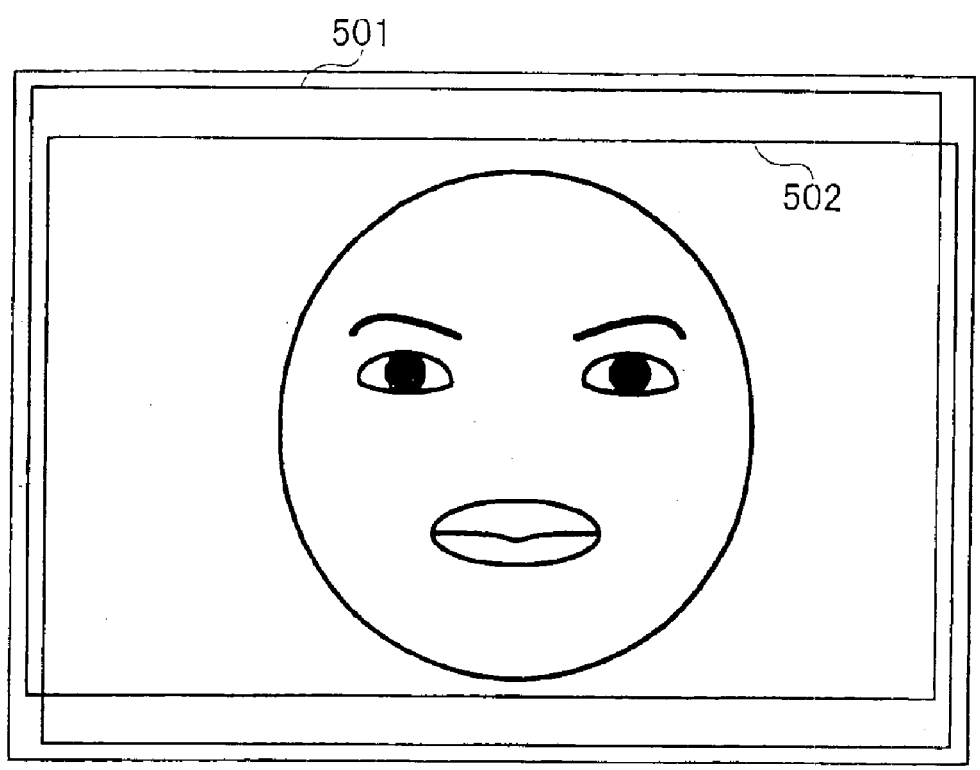
FIG. 5 is a view showing examples of two areas to detect an interval between eyes.

Partial image generating section 403 fetches an image of an area 501 and another image of an area 502 shown in FIG. 5 from the whole image of the input image signal 402, and outputs a first partial image signal 404 and a second partial image signal 405.

First eye-interval area detecting section 406 reads the first partial image signal 404 to detect an eye-interval area, and outputs coordinates of the eye-interval area as a first eye-interval area candidate signal 407.

Second eye-interval area detecting section 408 reads the second partial image signal 405 to detect an eye-interval area, and outputs coordinates of the eye-interval area as a second eye-interval area candidate signal 409.

Buffer section 410 stores the first eye-interval area candidate signal 407 and second eye-interval area candidate signal 409.

Overlap judging section 411 reads the first and second eye-interval area candidate signals from buffer section 410, judges an area value of a portion where the two detected eye-interval areas overlap, and outputs coordinates of the eye-interval area as an eye-interval area signal 412.

Face determining section 413 reads the eye-interval area signal 412, and outputs a face area signal 414 indicative of coordinates of a face area.

Eye-interval area detecting sections 406 and 408 may have the same configuration as eye-interval area detecting section 101 illustrated in the first embodiment. Further, when a height of the small area in the human face detecting apparatus illustrated in FIG. 1 is Vslit, and an upper-left point of the image is set to the origin (0,0) of the coordinates, for example, the upper-left coordinate of the area 501 shown in FIG. 5 is set to (1,1), and the upper-left coordinate of the area 502 is set to (2, Vslit/2+1). Thereby, each small area obtained in first eye-interval area detecting section 406 always overlaps either one of small areas obtained in second eye-interval area detecting section 408. In addition, a group of small areas obtained by dividing the area 501 is referred to as a first small area group, and a group of small areas obtained by dividing the area 502 is referred to as a second small area group.

Figure 6:
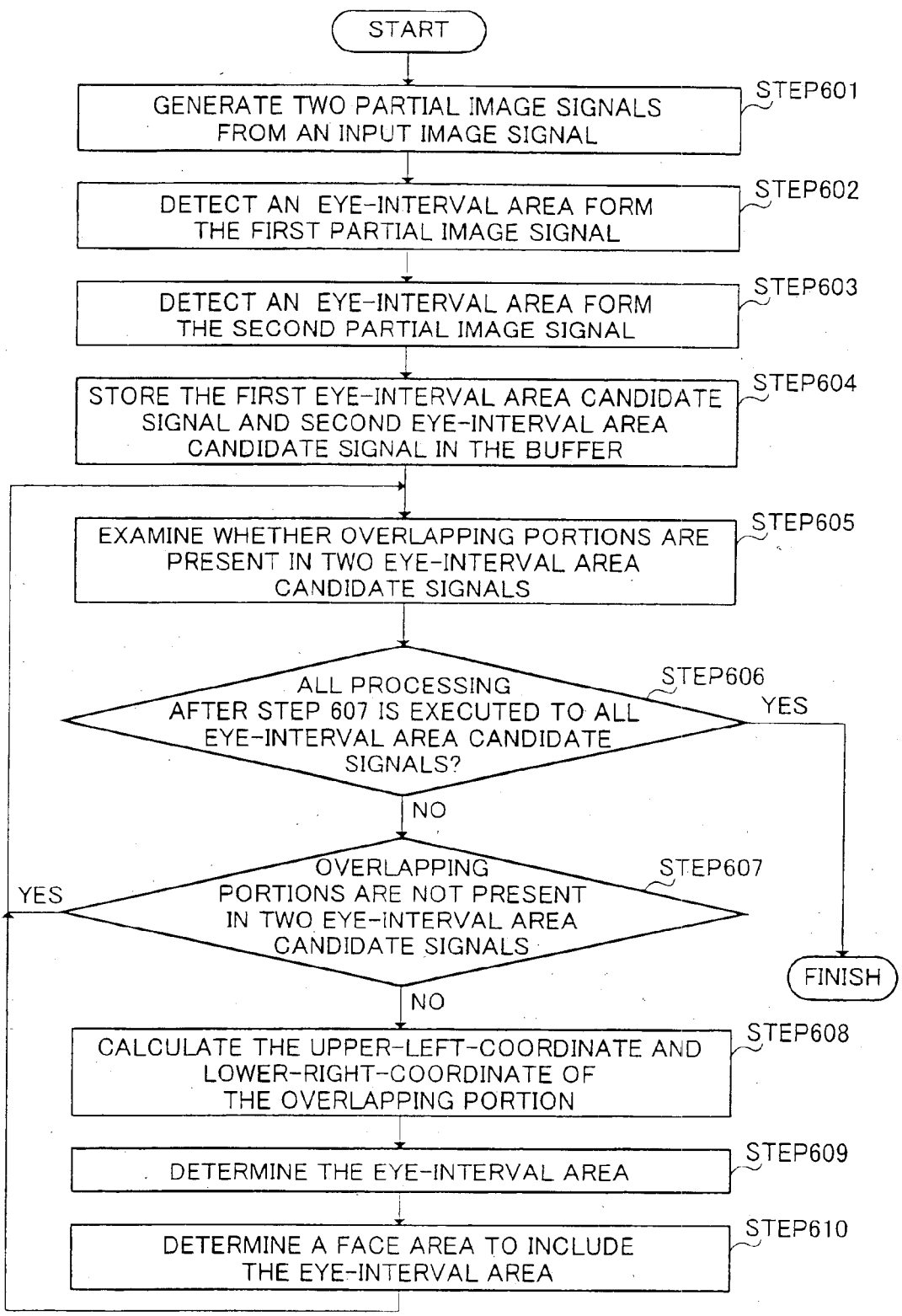
FIG. 6 is a flowchart indicating the operation of the apparatus for detecting a human face in the second embodiment of the present invention.

The operation of the human face detecting apparatus will be explained below using the flowchart in FIG. 6.

At step 601, partial image generating section 403 fetches the areas 501 and 502 shown in FIG. 5 from the whole image input by the input image signal 402, and outputs the image of the area 501 as the first partial image signal 404 and the image of the area 502 as the second partial image signal 405.

At step 602, first eye-interval area detecting section 406 reads the first partial image signal 404 to detect an eye-interval area, and outputs coordinates of the eye-interval area as the first eye-interval area candidate signal 407. For example, the operation indicated by the steps 201 to 210 in the first embodiment is executed, whereby the eye-interval area is detected.

At step 603, second eye-interval area detecting section 408 reads the second partial image signal 405 to detect an eye-interval area, and outputs coordinates of the eye-interval area as the second eye-interval area candidate signal 409.

Figure 7:
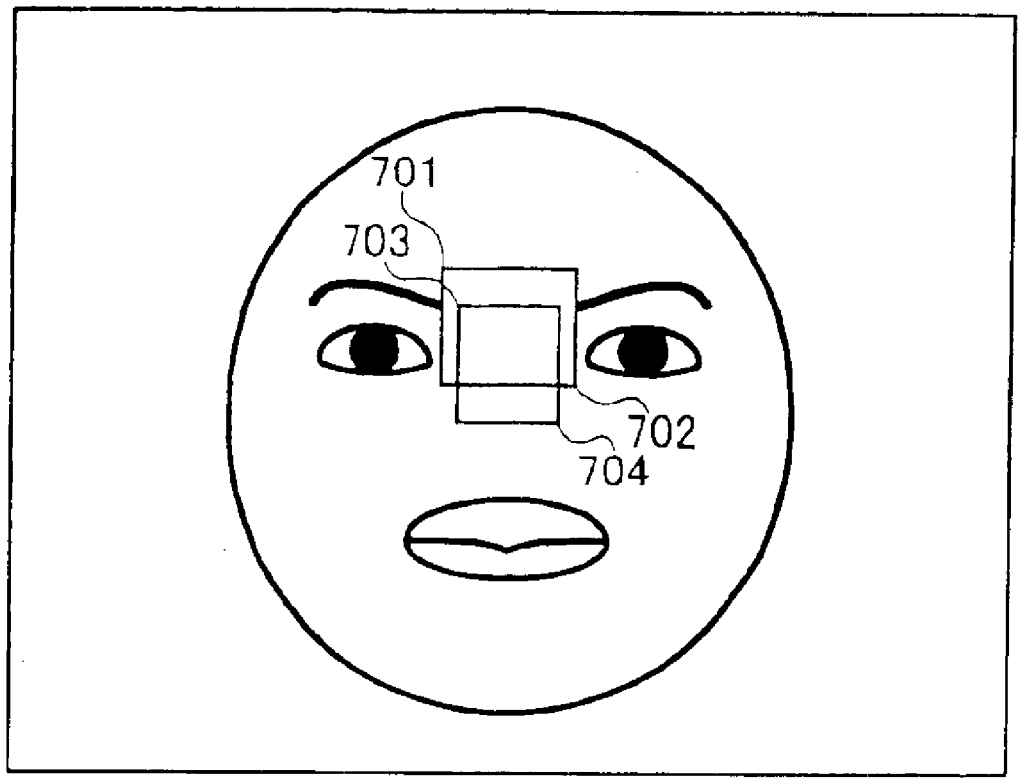
FIG. 7 is a view showing an example of detected two areas for an interval between eyes in the second embodiment of the present invention.

At step 604, buffer section 410 stores the first eye-interval area candidate signal 407 and second eye-interval area candidate signal 409. When the apparatus of this embodiment detects a human face from the image of the human face illustrated in FIG. 7, the upper-left coordinate and lower-right coordinate of the eye-interval area detected in the first eye-interval area detecting section are respectively points 701 and 702, and the upper-left coordinate and lower-right coordinate of the eye-interval area detected in the second eye-interval area detecting section are respectively points 703 and 704.

At step 605, overlap judging section 411 reads the first and second eye-interval candidate signals from buffer section 410, obtains the upper-left coordinate (xl1,yt1) and lower-right coordinate (xr1,yb1) of the eye-interval area detected in first eye-interval area detecting section 406 and the upper-left coordinate (xl2,yt2) and lower-right coordinate (xr2,yb2) of the eye-interval area detected in second eye-interval area detecting section 408, and examines whether overlapping portions are present in the two eye-interval areas.

When all the processing after the step 607 is executed to all the combinations of eye-interval area candidate signals, the human face detecting processing is finished (step 606).

When overlapping portions are not present in the two eye-interval areas, the processing flow returns to the step 605 (step 607).

When overlapping portions are present in the two eye-interval areas, the upper-left coordinate (xlo,yto) and lower-right coordinate (xro,ybo) of the overlapping portion are obtained (step 608).

At step 609, obtained are the area value S1 of an area (first eye-interval area) provided between the two coordinates, i.e., (xl1,yt1) and (xr1,yb1), the area value S2 of an area (second eye-interval area) provided between the two coordinates, i.e., (xl2,yt2) and (xr2,yb2), and the area value S0 of an area (overlapping portion) provided between two coordinates, i.e., (xlo,yto) and (xro,ybo). Further, when the following equations each of which indicates the ratio is more than a threshed Th are satisfied concurrently, output as the eye-interval area signal 412 are the upper-left coordinate (xlo,yto) and lower-right coordinate (xro,ybo) of the overlapping area.

At step 610, based on the coordinates indicated by the eye-interval area signal 412, face determining section 413 determines the coordinates of a face area according to a predetermined transformation equation to output as face area signal 414. The processing flow returns to the step 605 after the step 610 is executed.

While divided areas are different between the first small area group and second small area group in the above explanation, it may be possible to set small areas with different sizes.

According to this embodiment, when the two detected eye-interval areas partially overlap each other, the area value of the portion where the two areas partially overlap is large if the both areas include the eye-interval of the image, whereby it is possible to suppress the incorrect detection of an area of a human face and to detect a human face with high accuracy also in the case where many objects are shot in the background of the human face.

Further, since the overlap of candidate areas is judged with a small calculation amount, the judgment can be performed fast.

Furthermore, since the overlap of eye-interval candidate areas is only examined, the detecting method using the eye-interval area is hardly affected by a variation in face due to the expression of the face including mouth movement, presence or absence of mustache and/or hairstyle, and therefore is capable of suppressing the incorrect detection of an area of a human face and of detecting an area of a human face with high accuracy.

(Third Embodiment)

The third embodiment provides a more accurate apparatus for detecting a human face by combining the eye-interval area detecting section explained in the first embodiment and a section for examining the vicinity of an eye-interval area.

Figure 8:
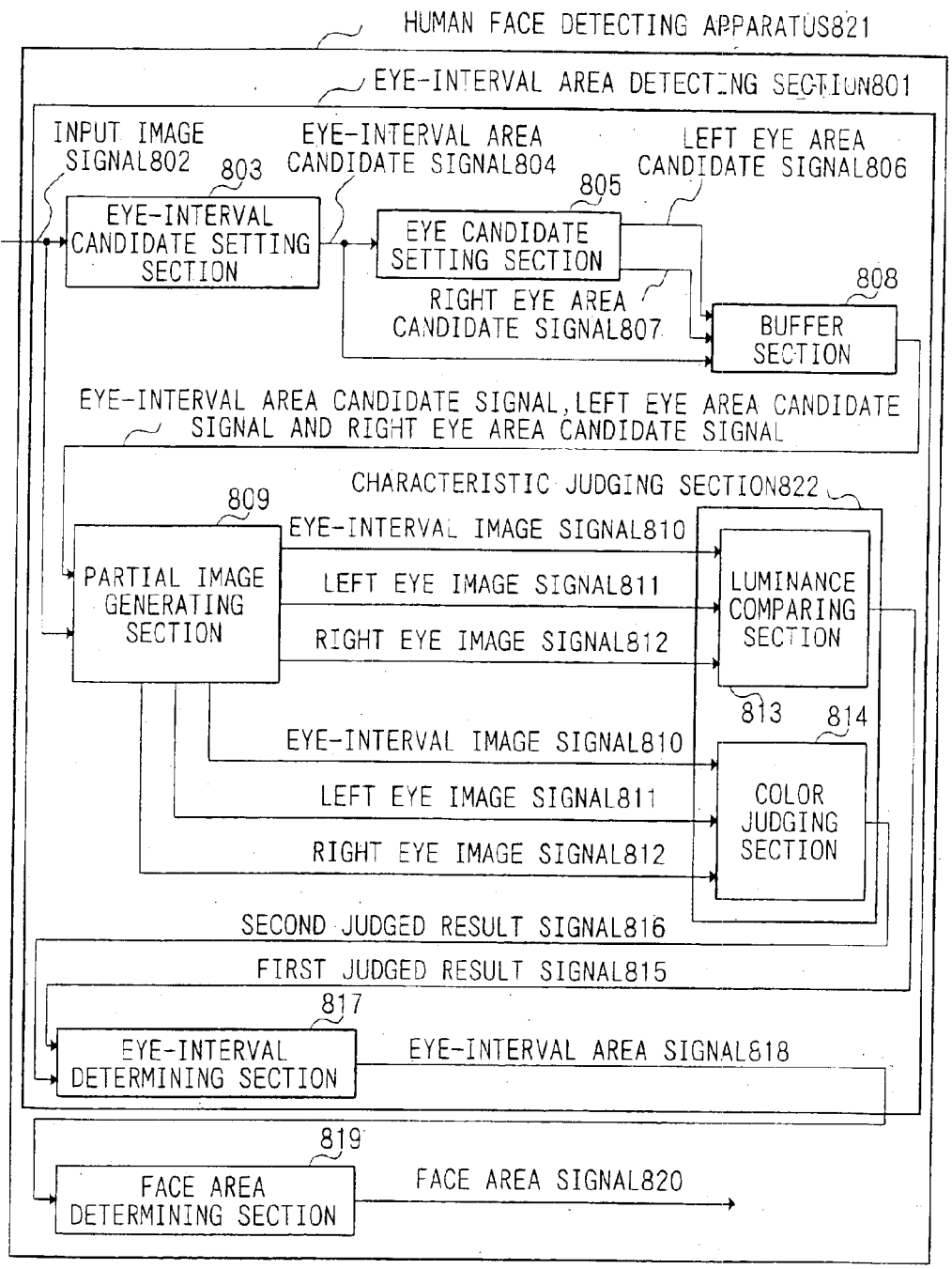
FIG. 8 is a diagram illustrating a schematic configuration of an apparatus for detecting a human face in a third embodiment of the present invention.

FIG. 8 is a diagram illustrating a schematic configuration of the apparatus for detecting a human face in the third embodiment of the present invention. In FIG. 8, an input image signal 802 is input to human face detecting apparatus 821, and is input to eye-interval candidate setting section 803 in eye-interval area detecting section 801.

Eye-interval candidate setting section 803 reads the input image signal 802, sets an eye-interval candidate area, and outputs coordinates of the eye-interval candidate area as an eye-interval area candidate signal 804.

Eye candidate setting section 805 reads the eye-interval area candidate signal 804, sets an eye candidate area on each of the right and left sides of the eye-interval candidate area, and outputs a left eye area candidate signal 806 and a right eye area candidate signal 807.

Buffer section 808 stores the eye-interval area candidate signal 804, left eye area candidate signal 806 and right eye area candidate signal 807.

Partial image generating section 809 fetches images of areas indicated by the eye-interval area candidate signal, left eye area candidate signal and right eye area candidate signal from the whole image input by the input image signal 802, and outputs an eye-interval image signal 810, left eye image signal 811 and right eye image signal 812.

Luminance comparing section 813 reads the eye-interval image signal 810, left eye image signal 811 and right eye image signal 812, compares the average luminance of the eye-interval candidate area, the average luminance of the left eye candidate area, and the average luminance of the right eye candidate area, and outputs a first judged result signal 815.

Color judging section 814 reads the eye-interval image signal 810, left eye image signal 811 and right eye image signal 812, examines the average color of the eye-interval candidate area, the average color of the left eye candidate area, and the average color of the right eye candidate area, and outputs a second judged result signal 816.

Eye-interval determining section 817 reads the first judged result signal 815 and second judged result signal 816, and outputs coordinates of the eye-interval area as an eye-interval area signal 818.

Face area determining section 819 reads the eye-interval area signal 818, and outputs a face area signal 820 indicative of coordinates of a face area.

Feature judging section 822 is comprised of luminance comparing section 813 and color judging section 814. Eye-interval candidate setting section 803 may have the same configuration as the eye-interval area detecting section illustrated in the first embodiment. Further, it may be possible to provide the section 803 with the same configuration as the human face detecting apparatus illustrated in the second embodiment except that the face determining section is eliminated, so that the section 803 outputs the eye-interval area signal 412.

Figure 9:
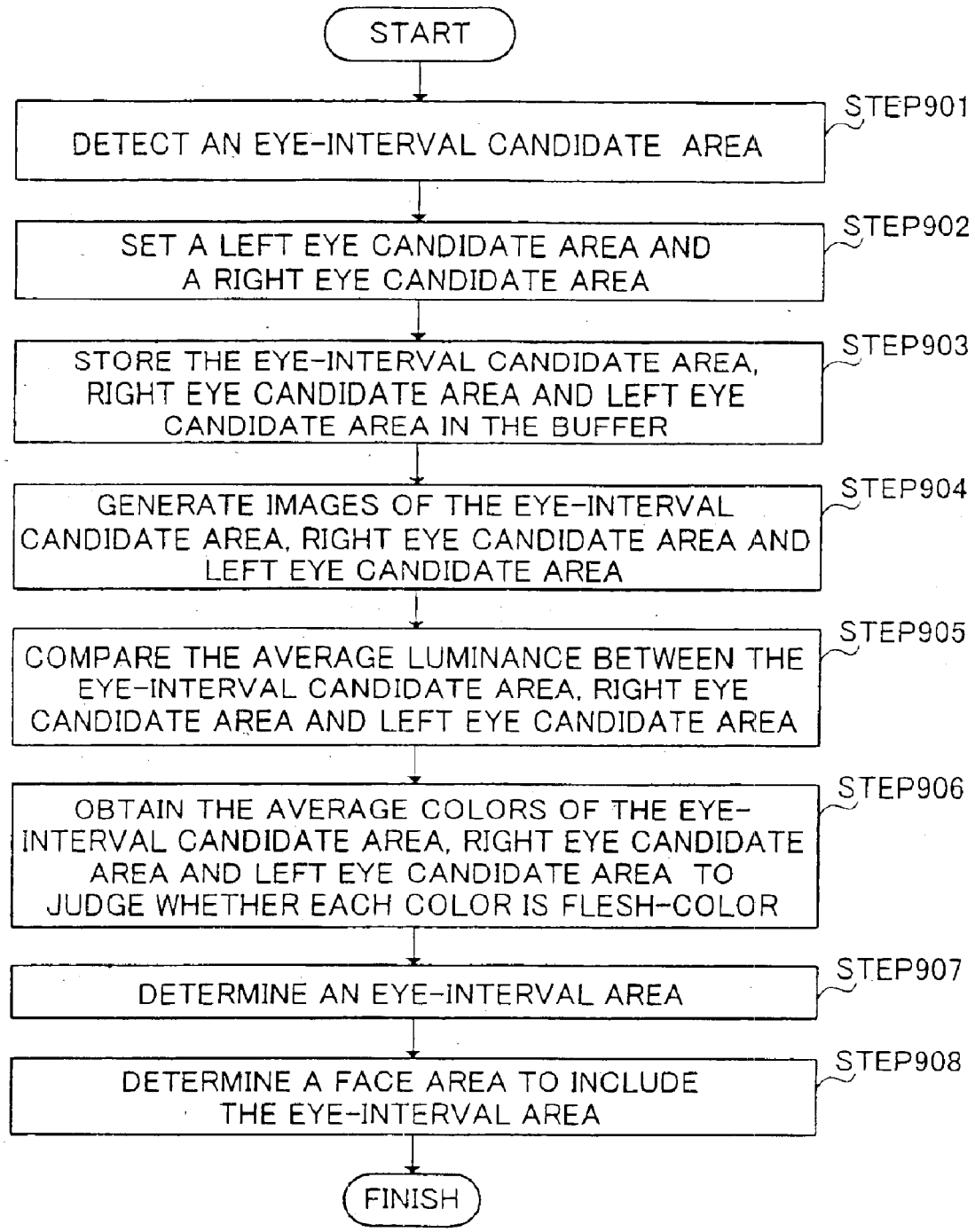
FIG. 9 is a flowchart indicating the operation of the apparatus for detecting a human face in the third embodiment of the present invention.

The operation of the human face detecting apparatus will be explained below using the flowchart in FIG. 9.

At step 901, eye-interval candidate setting section 803 reads the input image signal 802, detects an eye-interval area as an eye-interval candidate area, and outputs coordinates of the eye-interval candidate area as the eye-interval area candidate signal 804. For example, the operation indicated by the steps 201 to 211 explained in the first embodiment is executed, whereby the eye-interval area is detected. Further, it may be possible to execute the operation indicated by the steps 601 to 609 explained in the second embodiment.

Figure 10:
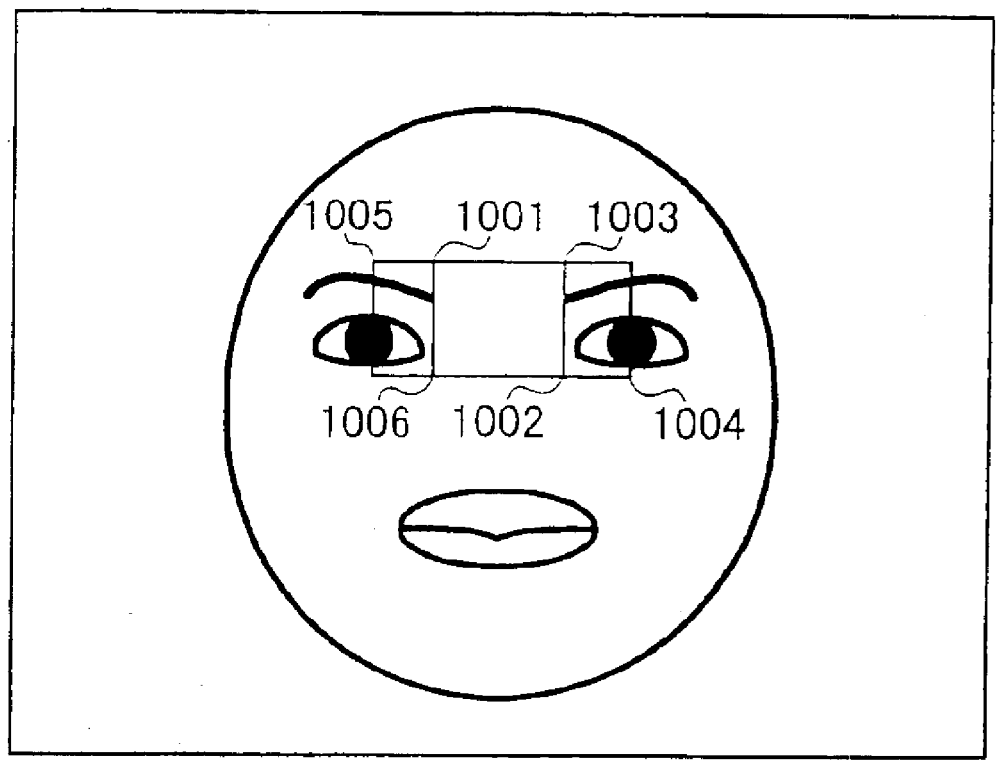
FIG. 10 is a view showing examples of a candidate area for an interval between eyes, candidate area for a left eye, and candidate area for a right eye.

At step 902, eye candidate setting section 805 reads the upper-left coordinate (xli,yti) and lower-right coordinate (xri,ybi) of the eye-interval candidate area from the eye-interval area candidate signal 805. Then, the section 805 sets the upper-left coordinate (xl1,yt1) and lower-right coordinate (xr1,yb1) of a left eye candidate area and the upper-left coordinate (xlr,ytr) and lower-right coordinate (xrr,ybr) of a right eye candidate area, and outputs the coordinates of the left eye candidate area as the left eye area candidate signal 806 and the coordinates of the right eye candidate area as the right eye area candidate signal 807. FIG. 10 shows examples of the upper-left coordinate 1001 and lower-right coordinate 1002 of the eye-interval candidate area, the upper-left coordinate 1003 and lower-right coordinate 1004 of the left eye candidate area, and the upper-left coordinate 1005 and lower-right coordinate 1006 of the right eye candidate area. Values of xll, ytl, xrl, ybl, xlr, ytr, xrr and ybr are determined according to the following equations.

$$xll=xri$$

$$ytl=yti$$

$$xrl=xll+(xri-xli)/2$$

$$ybl=ybi$$

$$xlr=xrr-(xri-xli)/2$$

$$ytr=yti$$

$$xrr=xli$$

$$ybr=ybi$$

At step 903, buffer section 808 stores the eye-interval area candidate signal 804, left eye area candidate signal 806 and right eye area candidate signal 807.

At step 904, partial image generating section 809 fetches images of areas indicated by the eye-interval area candidate signal, left eye area candidate signal and right eye area candidate signal from the whole image input by the input image signal 802. Then, the section 809 outputs the image of an eye-interval candidate area as the eye-interval image signal 810, the image of a left eye candidate area as the left eye image signal 811, and the image of an right eye candidate area as the right eye image signal 812.

At step 905, luminance comparing section 813 reads the eye-interval image signal 810, left eye image signal 811 and right eye image signal 812, and obtains the average Yi of the luminance in the eye-interval candidate area, the average Yl of the luminance in the left eye candidate area, and the average Yr of the luminance in the right eye candidate area. Then, in the case where Yi is more than Yl and is more than Yr, the section 813 sets the first judged result signal 815 to 1 (indicative of possibility of the eye-interval area). In the other cases, the section 813 sets the first judged result signal 815 to 0 (indicative of no possibility of the eye-interval area).

At step 906, color judging section 814 reads the eye-interval image signal 810, left eye image signal 811 and right eye image signal 812, and obtains the average of the color (Ri,Gi,Bi) in the eye-interval candidate area, the average of the color (Rl,Gl,Bl) in the left eye candidate area, and the average of the color (Rr,Gr,Br) in the right eye candidate area. In addition, Ri, Rl and Rr are indicative of red component of the color, Gi, Gl and Gr are indicative of green component of the color, and Bi, Bl and br are indicative of blue component of the color. Since the flesh-color is rich in the red component and poor in the blue component, the second judged result signal 816 is set to 1 (indicative of possibility of the eye-interval area) in the case where the following equations are all satisfied at the same time, while being set to 0 (indicative of no possibility of the eye-interval area) in the other cases.

$$Ri>Gi$$

$$Gi>Bi$$

$$Rl>Gl$$

$$Gl>Bl$$

$$Rr>Gr$$

$$Gr>Br$$

At step 907, when the first judged result signal 815 and second judged result signal 816 are 1 at the same time, eye-interval determining section 817 outputs the coordinates of the eye-interval area as the eye-interval area signal 417.

At step 908, based on the coordinates indicated by the eye-interval area signal 817, face determining section 819 determines coordinates of a face area according to a predetermined transformation equation to output as the face area signal 820.

While the width of the left eye candidate area and the width of the right eye candidate area are set to half the width of the eye-interval candidate area in the above explanation, it may be possible to change widths and positions of right and left eyes candidate areas corresponding to an image. For example, at the step 902, eye search areas may be arranged on the right and left sides of the eye-interval area, and the widths and positions of the left eye candidate area and of the right eye candidate area may be determined using the luminance characteristics and shape characteristics in the search areas.

Further, while the value of the second judged result signal is determined only using the level relationship between the red component, blue component and green component in color, it may be possible to determine the value using another method. For example, it may be possible to examine a flesh-color range in color space in advance, to judge whether the average color in the eye-interval candidate area, left eye candidate area or right eye candidate area is in the flesh-color range, and to determine the value of the second judged result signal. Further, it may be possible to judge whether the average color in the left eye candidate area is similar to the average color in the right eye candidate area, and to determine the value of the second judged result signal. Furthermore, it may be possible to judge whether the average color in the upper portion of the left eye candidate area is similar to the average color in the lower portion of the eye-interval candidate area, and to determine the value of the second judged result signal.

While the eye-interval area is determined using both the judged result in luminance comparing section 813 and the judged result in color judging section 814, it may be possible to determine the area only using either judged result. Further, it may be possible to determine the eye-interval area using together another section for performing a neural and/or statistical method. Furthermore, it may be possible to detect right and left eyes candidate areas first before determining the eye-interval candidate area.

According to this embodiment, since an eye-interval area has a larger luminance value than an eye area not depending on a variation in expression of a face and movement of head, the detecting method using the eye-interval area is immune to a variation in face due to the expression of the face including eye and mouth motions, presence or absence of mustache and/or movement of the head, and thereby is capable of detecting an area of a human face with a small calculation amount, as well as in the case where many objects are shot in the background of the face.

Further, since the average of the color in the vicinity of an eye and of the color in an eye-interval area is similar to the flesh-color, also in the case where many objects are shot in the background of a face, it is possible to suppress the incorrect detection of an area of a human face and to detect an area of a human face with high accuracy.

(Fourth Embodiment)

Figure 11:
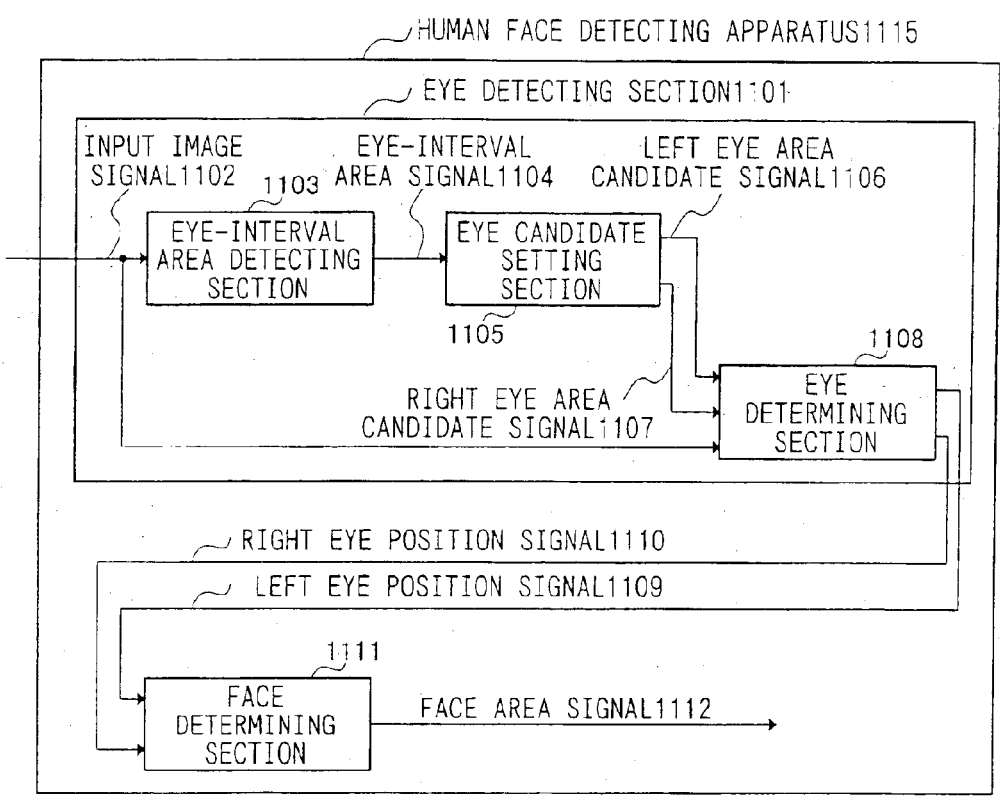
FIG. 11 is a diagram illustrating a schematic configuration of an apparatus for detecting a human face in a fourth embodiment of the present invention.

FIG. 11 is a diagram illustrating a schematic configuration of an apparatus for detecting a human face in the fourth embodiment of the present invention. In FIG. 11, an input image signal 1102 is input to human face detecting apparatus 1115, and is input to eye detecting section 1101.

Eye-interval area detecting section 1103 reads the input image signal 1102, detects an eye-interval area, and outputs coordinates of the eye-interval area as an eye-interval area signal 1104.

Eye candidate setting section 1105 reads the eye-interval area signal 1104, sets an eye candidate area on each of the right and left sides of the eye-interval area, and outputs a left eye area candidate signal 1106 and a right eye area candidate signal 1107.

Eye determining section 1108 fetches images of areas indicated by the left eye area candidate signal 1106 and right eye area candidate signal 1107 from the whole image input by the input image signal 1102, examines the luminance characteristic or shape characteristic of each image to determine a position of a right eye and a position of a left eye, and outputs a left eye position signal 1109 and right eye position signal 1110.

Face determining section 1111 reads the left eye position signal 1109 and right eye position signal 1110, and outputs a face area signal 1112 indicative of coordinates of the face area.

Figure 12:
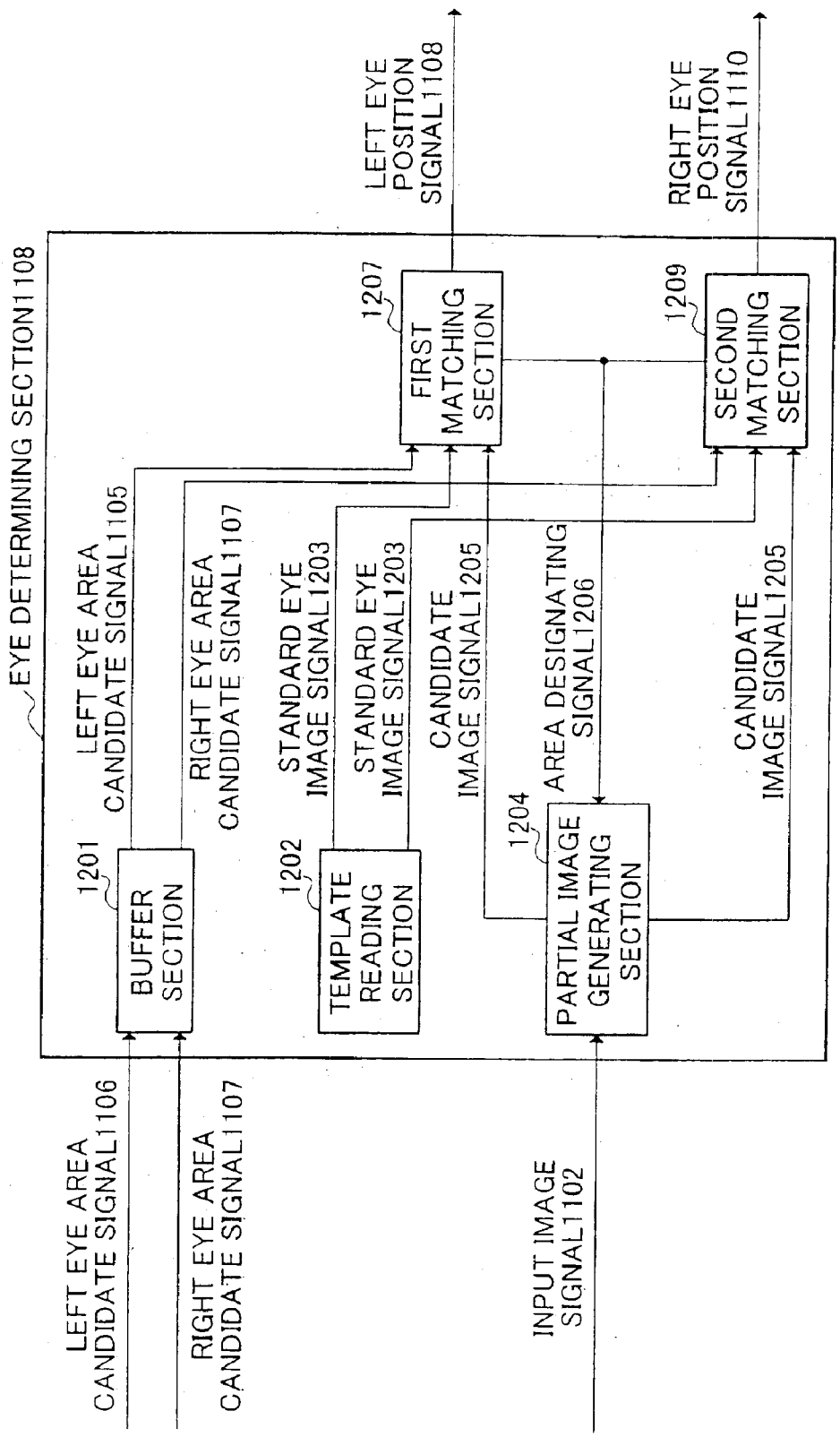
FIG. 12 is a diagram illustrating a schematic configuration of an eye determining section in the fourth embodiment of the present invention.

FIG. 12 is a diagram illustrating a schematic configuration of eye determining section 1108 in the fourth embodiment. Eye determining section 1108 receives as its inputs the input image signal 1102, left eye area candidate signal 1106 and right eye area candidate signal 1107.

Buffer section 1201 stores the left eye area candidate signal 1106 and right eye area candidate signal 1107.

Template reading section 1202 reads a standard eye template prepared in advance to output as a standard eye image signal 1203.

Partial image generating section 1204 fetches an image of the same size as the template from candidate areas for both eyes to output as a candidate image signal 1205.

The area to be fetched by partial image generating section 1204 is designated by an area designating signal 1206.

First matching section 1207 compares the standard eye image signal 1203 with the candidate image signal 1205 to determine a position of a left eye, and outputs the left eye position signal 1109.

Second matching section 1209 compares the standard eye image signal 1203 with the candidate image signal 1205 to determine a position of a right eye, and outputs the right eye position signal 1110.

For example, eye-interval area detecting section 1103 may have the same configuration as eye-interval area detecting section 810 illustrated in the third embodiment.

Figure 13:
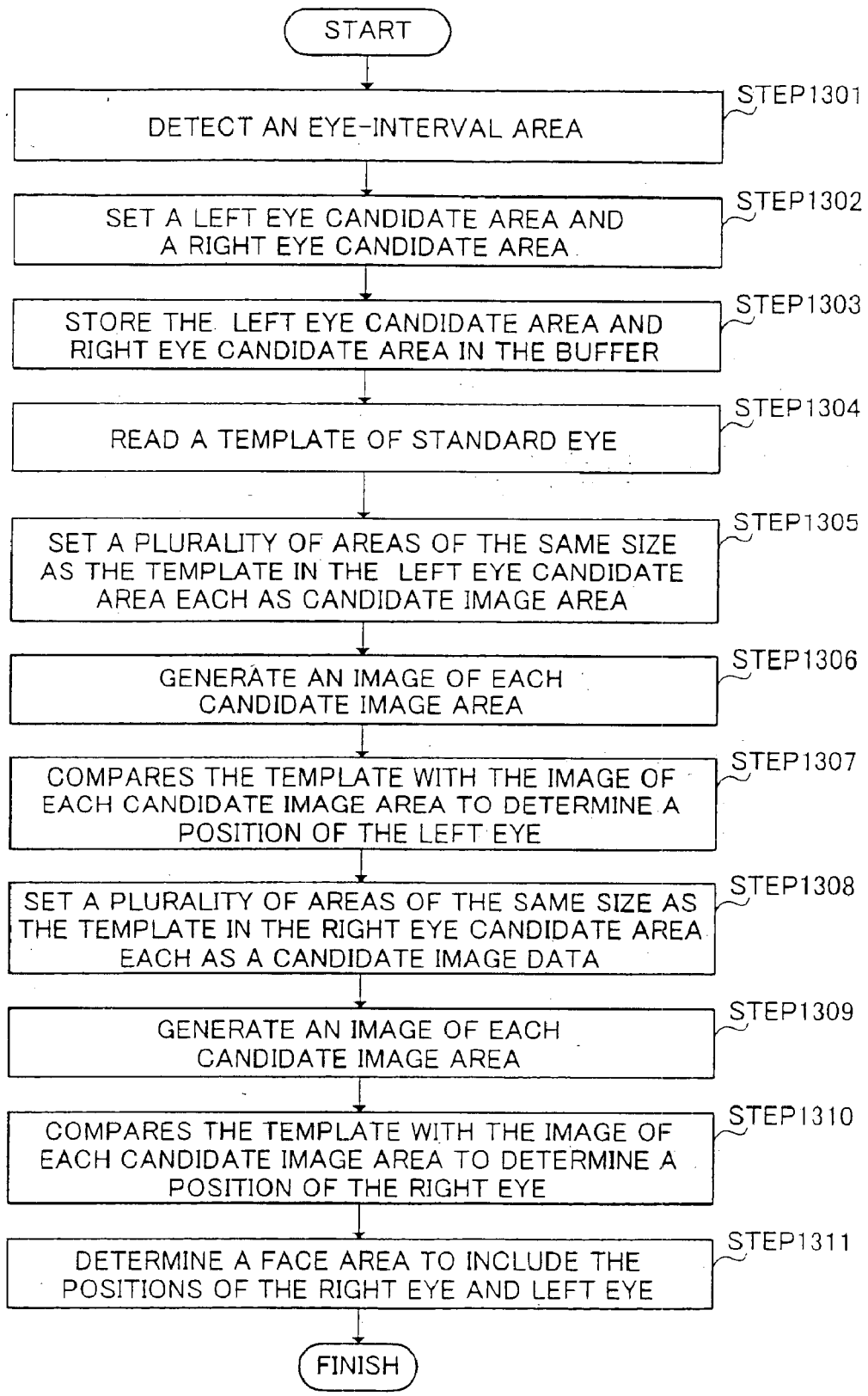
FIG. 13 is a flowchart indicating the operation of the apparatus for detecting a human face in the first embodiment of the present invention.

The operation of the human face detecting apparatus will be explained below using the flowchart in FIG. 13.

At step 1301, eye-interval area detecting section 1103 reads the input image signal 1102 to detect an eye-interval area, and outputs coordinates of the eye-interval area as the eye-interval area signal 1104. For example, the operation illustrated in the third embodiment is performed, whereby the eye-interval area is detected.

Figure 14:
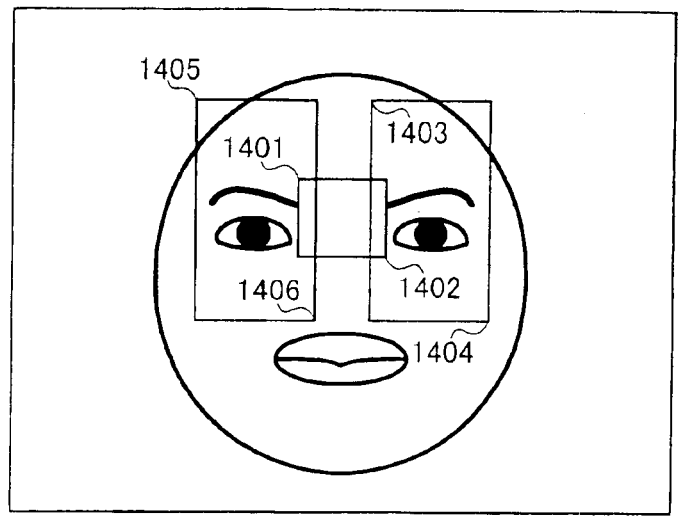
FIG. 14 is a view showing examples of a candidate area for an interval between eyes, candidate area for a left eye, and candidate area for a right eye.

At step 1302, eye candidate setting section 1105 reads the upper-left coordinate (xli,yti) and lower-right coordinate (xri,ybi) of the eye-interval area from the eye-interval area signal 1104. Then, the section 1105 sets the upper-left coordinate (xll,ytl) and lower-right coordinate (xrl,ybl) of a left eye candidate area and the upper-left coordinate (xlr,ytr) and lower-right coordinate (xrr,ybr) of a right eye candidate area, and outputs the coordinates of the left eye candidate area as the left eye area candidate signal 1106 and the coordinates of the right eye candidate area as the right eye area candidate signal 1107. FIG. 14 shows examples of the upper-left coordinate 1401 and lower-right coordinate 1402 of the eye-interval area, the upper-left coordinate 1403 and lower-right coordinate 1404 of the left eye candidate area, and the upper-left coordinate 1405 and lower-right coordinate 1406 of the right eye candidate area. Values of xll, ytl, xrl, ybl, xlr, ytr, xrr and ybr are determined according to the following equations.

$$xll=xri-(xri-xli)/3$$

$$ytl=yti-(ybi-yti)$$

$$xrl=xll+(xri-xli)$$

$$ybl=ybi+(ybi-yti)$$

$$xlr=xrr-(xri-xli)$$

$$ytr=yti-(ybi-yti)$$

$$xrr=xli+(xri-xli)/3$$

$$ybr=ybi+(ybi-yti)$$

At step 1303, buffer section 1201 stores the left eye area candidate signal 1106 and right eye area candidate signal 1107.

At step 1304, template reading section 1202 reads the standard eye template prepared in advance to output as the standard eye image signal 1203.

At step 1305, first matching section 1207 reads the left eye area candidate signal from buffer section 1201, and sets an area of the same size as the template in the left eye candidate area as a candidate image area. A plurality of candidate image areas is set. The coordinates of the nth (n is an integer equal to or more than 1) candidate image area are output as an nth area designating signal 1206.

At step 1306, partial image generating section 1204 fetches an image of each candidate image area to output as the candidate image signal 1205.

At step 1307, first matching section 1207 compares the standard eye image signal 1203 with each candidate image signal 1205, and obtains the candidate image signal having the largest matching degree with the standard eye image signal. The section 1207 examines a number of the candidate image signal having the largest matching degree with the standard eye image signal, and outputs coordinates of the candidate image area having the number as the left eye position signal 1109.

At step 1308, second matching section 1209 reads the right eye area candidate signal from buffer section 1201, and sets an area of the same size as the template in the right eye candidate area as a candidate image area. A plurality of candidate image areas is set. The coordinates of the nth (n is an integer equal to or more than 1) candidate image area are output as the nth area designating signal 1206.

At step 1309, partial image generating section 1204 fetches an image of each candidate image area to output as the candidate image signal 1205.

At step 1310, second matching section 1209 compares the standard eye image signal 1203 with each candidate image signal 1205, and obtains the candidate image signal having the largest matching degree with the standard eye image signal. The section 1209 examines a number of the candidate image signal having the largest matching degree with the standard eye image signal, and outputs coordinates of the candidate image area having the number as the left eye position signal 1110.

At step 1311, face determining section 1111 examines the center coordinate of a left eye from the left eye position signal 1109, further examines the center coordinate of a right eye from the right eye position signal 1110, and based on each coordinate, determines coordinates of a face area according to a predetermined transformation equation to output as the face area signal 1112. Assuming that the center coordinate of the left eye and the center coordinate of the right eye are respectively (xl,yl) and (xr,yr), and that the upper-left-coordinate and lower-right-coordinate of the face area are respectively (xlf,ytf) and (xrf,ybf), for example, it is predetermined that the coordinates of the face area are obtained from the following equations.

$$xlf = xr - (xl-xr)/2$$

$$xrf = xl + (xl-xr)/2$$

$$ytf = (yl+yr)/2 - (xrf-xlf) \times 0.2$$

$$ytb = (yl+yr)/2 - (xrf-xlf) \times 0.8$$

While eye positions are determined using the template matching with respect to images of both eyes candidate areas in the above explanation, it may be possible to change the configuration of eye determining section 1108, and to determine eye positions using another method other than the template matching. For example, it may be possible to determine eye positions using the symmetry in the edge direction in both eyes candidate areas, or to determine eye positions using a experimental knowledge. Further, it may be possible to determine a position of a left eye first and then to determine a position of a right eye.

According to this embodiment, since an eye-interval area varies little due to the expression of the face and the whole movement of the head and is spaced away from the mouth and mustache, the area is hardly affected by a variation in face due to the expression of the face including eyes and mouth motions, presence or absence of mustache and/or whole movement of the head, and therefore using the eye-interval area enables an area of a human face to be detected.

Further, limiting to areas around eyes, since the luminance distribution of an eye is different greatly from that of another area other than the eye, the eye determining section is capable of detecting respective positions of a right eye and a left eye.

(Fifth Embodiment)

Figure 15:
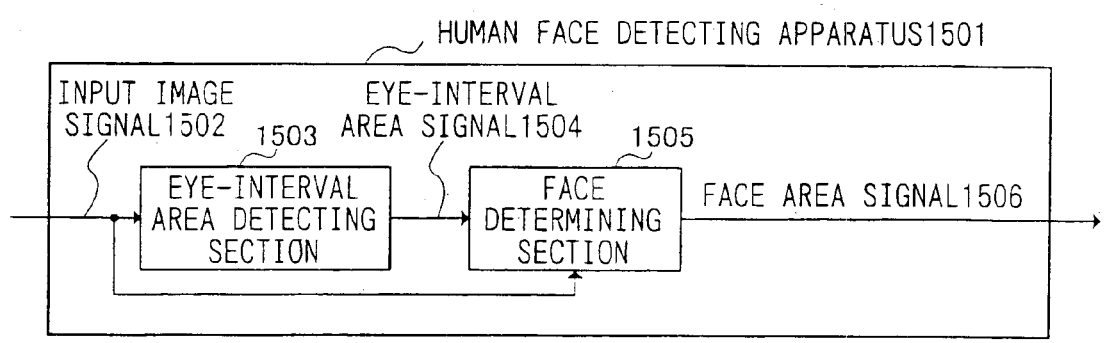
FIG. 15 is a diagram illustrating a schematic configuration of an apparatus for detecting a human face in a fifth embodiment of the present invention.

FIG. 15 is a diagram illustrating a schematic configuration of an apparatus for detecting a human face in the fifth embodiment of the present invention. In FIG. 15, an input image signal 1502 is input to human face detecting apparatus 1501. Eye-interval area detecting section 1503 reads the input image signal 1502 to detect an interval between eyes, and outputs coordinates of the eye-interval area as an eye-interval area signal 1504.

Face determining section 1505 reads the eye-interval area signal 1504 and the input image signal 1502, determines an area having a color similar to the average color of the eye-interval area from among areas in the vicinity of the eye-interval area, and outputs a face area signal 1506 indicative of coordinates of a face area.

For example, eye-interval area detecting section 1503 may have the same configuration as the eye-interval area detecting section illustrated in the third embodiment.

Figure 16:
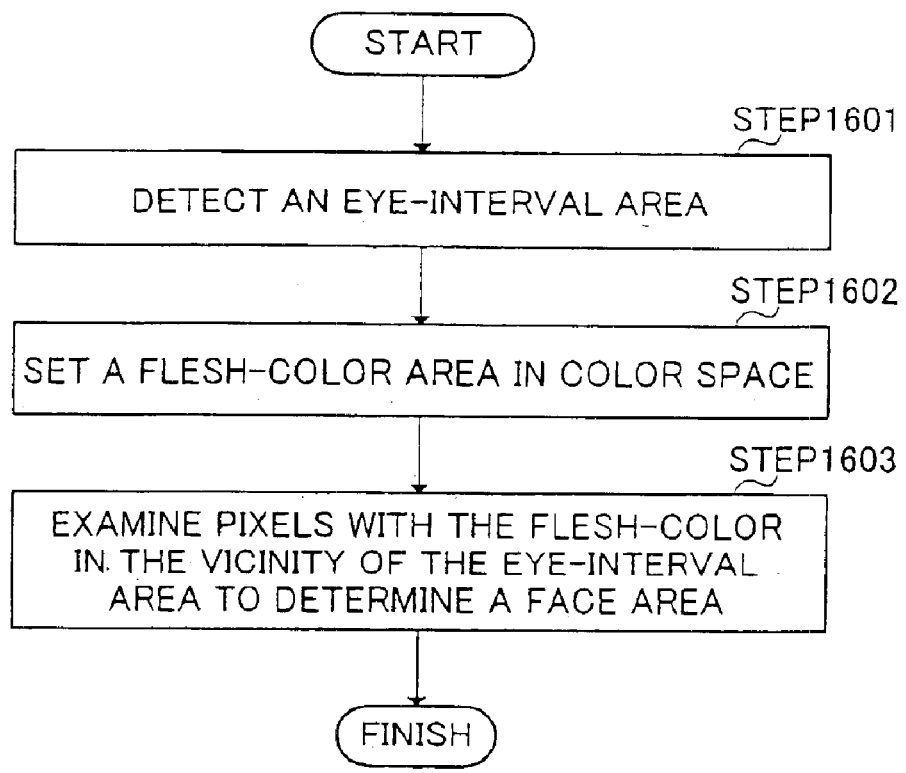
FIG. 16 is a flowchart indicating the operation of the apparatus for detecting a human face in the fifth embodiment of the present invention.

The operation of the human face detecting apparatus will be explained below using the flowchart in FIG. 16.

At step 1601, eye-interval area detecting section 1503 reads the input image signal 1502 to detect an eye-interval area, and outputs coordinates of the eye-interval area as the eye-interval area signal 1504. For example, the operation illustrated in the third embodiment is performed, whereby the eye-interval area is detected.

At step 1602, face determining section 1505 calculates the average Cm of colors of pixels contained in the eye-interval area, and obtains, as the flesh-color, colors contained in a spherical area with the average color Cm as the center in color space.

At step 1603, face determining section 1505 sets a face candidate area in the vicinity of the eye-interval area, fetches pixels with the flesh-color in the face candidate area as flesh-colored pixels, and obtains as a face area a rectangle area containing flesh-colored pixels whose ratio is more than a predetermined value. Then, the section 1505 outputs the upper-left-coordinate and lower-right-coordinate of the face area as the face area signal 1506.

While a face area is determined using colors contained in an eye-interval area in the above explanation, it may be possible to determine a face area using another method. For example, as illustrated in the first to fourth embodiments, it may be possible to determine coordinates of a face area according to a predetermined transformation equation.

According to this embodiment, since the eye-interval area varies little due to the expression of the face and whole movement of the head and is spaced away from the mouth and mustache, the area is hardly affected by a variation in face due to the expression of the face including eyes and mouth motions, presence or absence of mustache and/or whole movement of the head, and therefore using the eye-interval area enables a face area to be detected. Further, since the color of an eye-interval area is similar to the color of the face skin, the detecting method using the eye-interval area is hardly affected by lighting conditions and individual difference, and is capable of detecting a face area with a small calculation amount.

(Sixth Embodiment)

Figure 17:
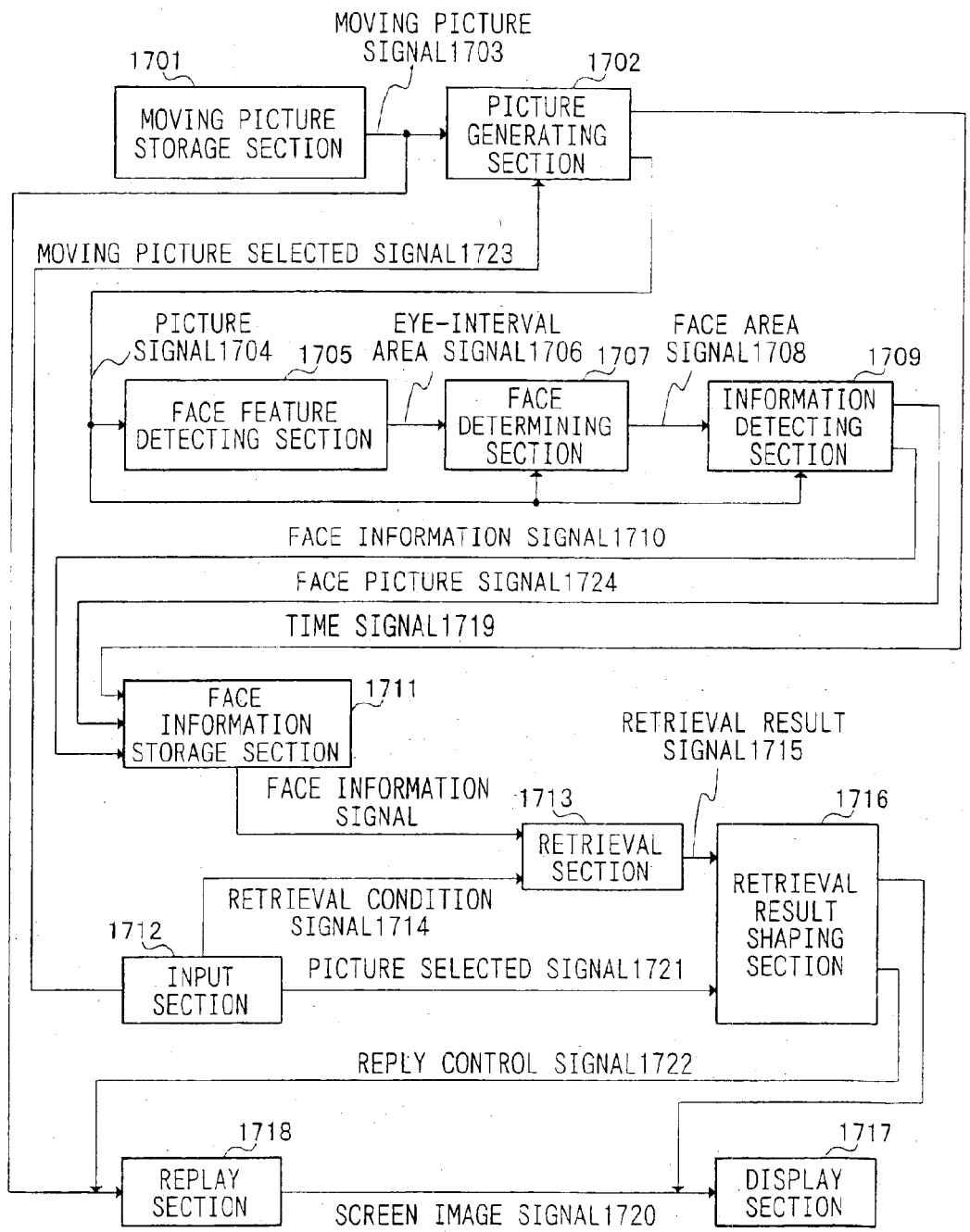
FIG. 17 is a diagram illustrating a schematic configuration of a moving picture retrieval apparatus in a sixth embodiment of the present invention.

FIG. 17 is a diagram illustrating a schematic configuration of a moving picture retrieval apparatus in the sixth embodiment of the present invention. In FIG. 17, moving picture storage section 1701 stores moving picture files.

Picture generating section 1702 reads a moving picture signal 1703 indicative of a moving picture of a moving picture file designated by a moving picture selected signal 1723 from moving picture storage section 1701, and outputs a picture signal 1704 indicative of a frame picture and a time signal 1719 indicative of a time of the frame picture.

Face feature detecting section 1705 reads the picture signal 1704 to detect an eye-interval area, and outputs coordinates of the eye-interval area as an eye-interval area signal 1706.

Face determining section 1707 reads the eye-interval area signal 1706 and picture signal 1704, determines an area whose color is similar to the average color of the eye-interval area from among areas in the vicinity of the eye-interval area, and outputs a face area signal 1708 indicative of coordinates of a face area.

Information detecting section 1709 reads the face area signal 1708 and picture signal 1704, fetches a picture of the face area, obtains the sex and age of the face to generate a face information signal 1710, and outputs a face picture signal 1724 and the face information signal 1710.

Face information storage section 1711 stores the face picture signal 1724, face information signal 1710, and time signal 1719 as a moving picture information file.

Input section 1712 is used to select the moving picture file, to input a retrieval conditional expression, and to select a face picture.

Retrieval section 1713 reads a retrieval condition signal 1714 from the input section, and retrieves information matching with the retrieval conditional expression from the moving picture information files stored in face information storage section 1711 to output as a retrieval result signal 1715.

Retrieval result shaping section 1716 stores the retrieval result signal 1715, performs the shaping to the retrieval result so as to enable a user to understand readily, and thereby outputs a screen image signal 1720, while reading a picture selected signal indicative of the face image selected result and thereby outputting a replay control signal 1722 for replaying a moving picture.

Display section 1717 reads the screen image signal 1720 to display a moving picture and retrieval result.

Replay section 1718 converts the moving picture signal into the screen image signal 1720 to display the moving picture stored in moving picture storage section 1701 on display section 1717.

For example, face feature detecting section 1705 may have the same configuration as the eye-interval detecting section illustrated in the third embodiment. As the format of the moving picture file, compression type formats such as MPEG1, MPEG2 and DV and non-compression type formats can be used. Moving picture storage section 1701 and face information storage section 1711 may be achieved by a storage medium such as a hard disk, DVD-RAM and PD. Picture generating section 1702, face feature detecting section 1705, face determining section 1707, information detecting section 1709, retrieval section 1713, retrieval result shaping section 1716, and replay section 1718 may be achieved by a CPU of a personal computer. Display section 1717 may be achieved by a display device such a monitor. Input section 1712 may be achieved by a pointing device such as a keyboard and mouse.

In the moving picture retrieval apparatus, the moving picture information files are generated in advance, and then a face image is retrieved by using the retrieval section.

Figure 18:
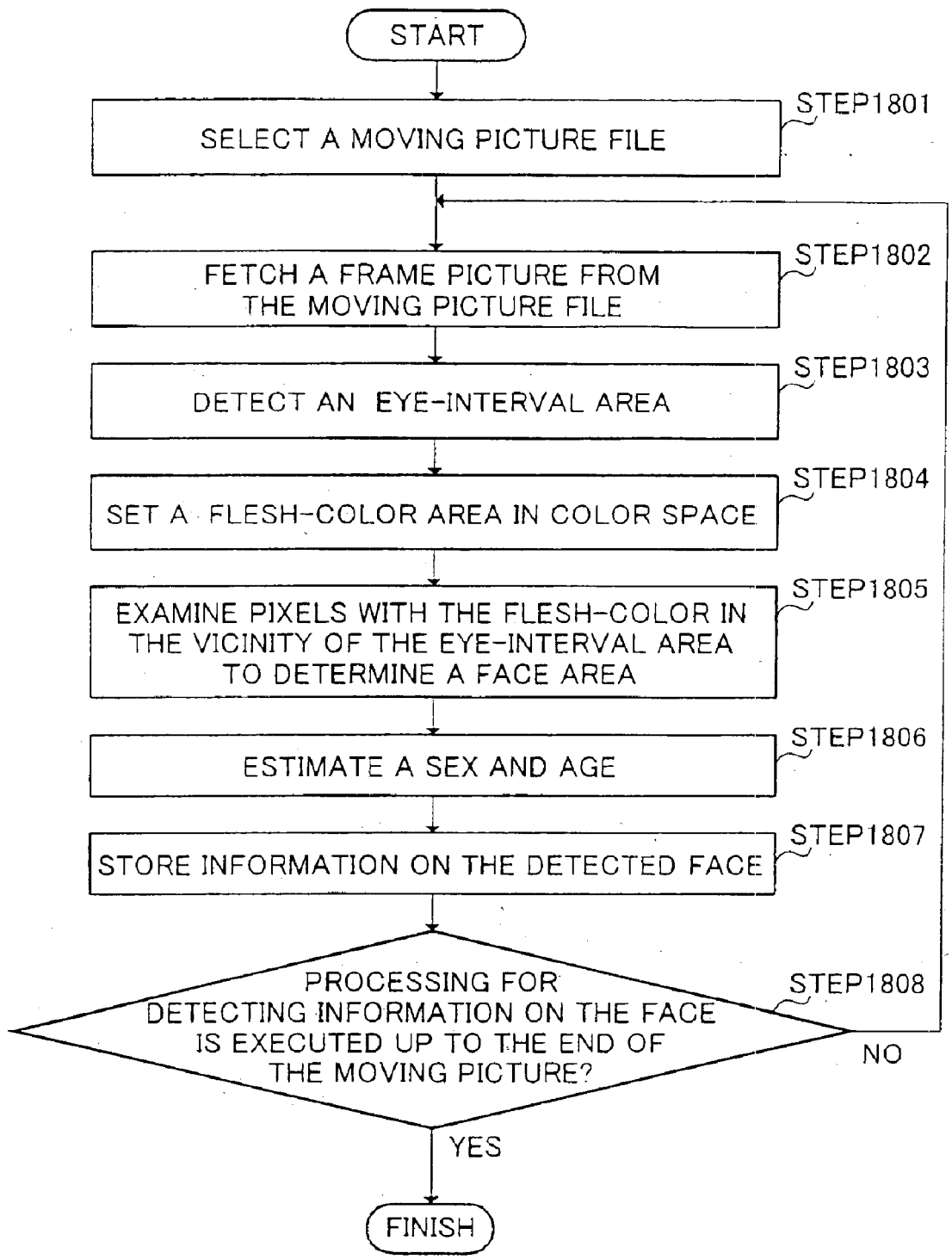
FIG. 18 is a flowchart indicating the operation for generating a moving picture information file and face picture file in the moving picture retrieval apparatus in the sixth embodiment of the present invention.

The operation for generating the moving picture information file using the moving picture retrieval apparatus will be explained first using the flowchart in FIG. 18.

At step 1801, one moving picture file is selected from among those files stored in moving picture storage section 1701. The selected result is input to picture generating section 1702 as the moving picture selected signal.

At step 1802, picture generating section 1702 reads the moving picture signal 1703 from moving picture storage section 1701, and fetches a frame of a picture of the moving picture file selected at the step 1802 to output as the picture signal 1704.

At step 1803, face feature detecting section 1705 reads the picture signal 1704 to detect an eye-interval area, and outputs coordinates of the eye-interval area as the eye-interval area signal 1706. For example, the operation illustrated in the third embodiment is performed, whereby the eye-interval area is detected.

At step 1804, in the similar way to the step 1602 in the fifth embodiment, face determining section 1707 calculates the average Cm of colors of pixels contained in the eye-interval area, and obtains, as the flesh-color, colors contained in a spherical area with the average color Cm as the center in color space.

At step 1805, in the similar way to the step 1603 in the fifth embodiment, face determining section 1707 sets a face candidate area in the vicinity of the eye-interval area, fetches pixels with the flesh-color in the face candidate area as flesh-colored pixels, and obtains as a face area a rectangle area containing flesh-colored pixels whose ratio is more than a predetermined value. Then, the section 1708 outputs the upper-left-coordinate and lower-right-coordinate of the face area as the face area signal 1708.

At step 1806, information detecting section 1709 executes a male-and-female classification function g1 and an age classification function g2. The male-and-female classification function g1 has as parameters a value of the face area signal and the frame picture indicated by the picture signal, and is used to classify into a male and female to output a classified result res1. The age classification function g2 also has as parameters the value of the face area signal and the frame picture indicated by the picture signal, and is used to classify into ages to output a classified result res2.

Information detecting section 1709 outputs the face information signal 1710 indicative of the upper-left-coordinate and lower-right-coordinate of the face area and the classified results res1 and res2, fetches a picture of the face area indicated by the face area signal from the frame picture indicated by the picture signal, and thereby further outputs the face picture signal 1724.

As a method for achieving the male-and-female classification function g1, a statistical method may be applied that beforehand collects a plurality of pictures of faces whose sexes are already known, and that based on the collected face pictures, performs the processing such as the judgment and analysis. Similarly, the age classification function g2 may be achieved by a statistical method that beforehand collects a plurality of pictures of faces whose ages are already known, and that based on the collected face pictures, performs the processing such as the judgment and analysis. In addition, it may be also possible to achieve the classification functions by the learning of a neutral network.

At step 1807, face information storage section 1711 stores the time of the frame picture indicated by the time signal 1719 and the information indicated by the face information signal 1710 as a moving picture information file. Further, the picture of a face area indicated by the face image signal is stored as a face picture file except the case where a position of a face detected from a frame picture timewise close to the current frame picture (for example, a frame picture 0.5 seconds before the current picture) is close to a position of a face detected from the current frame picture.

At step 1808, the processing flow returns to the step 1802 to fetch the information on a face from another frame picture. In addition, in the case where the processing of the steps 1802 to 1807 is executed up to the end of the moving picture, the processing flow does not return to the step 1802, and the processing is finished that generates the moving picture information file and face picture file. Further, since a face is present for at least a few seconds on a screen, it is not necessary to fetch all the frame pictures at the step 1802. For example, fetching a frame picture every 0.5 seconds enables faces of all the existing people to be detected.

Figure 19:
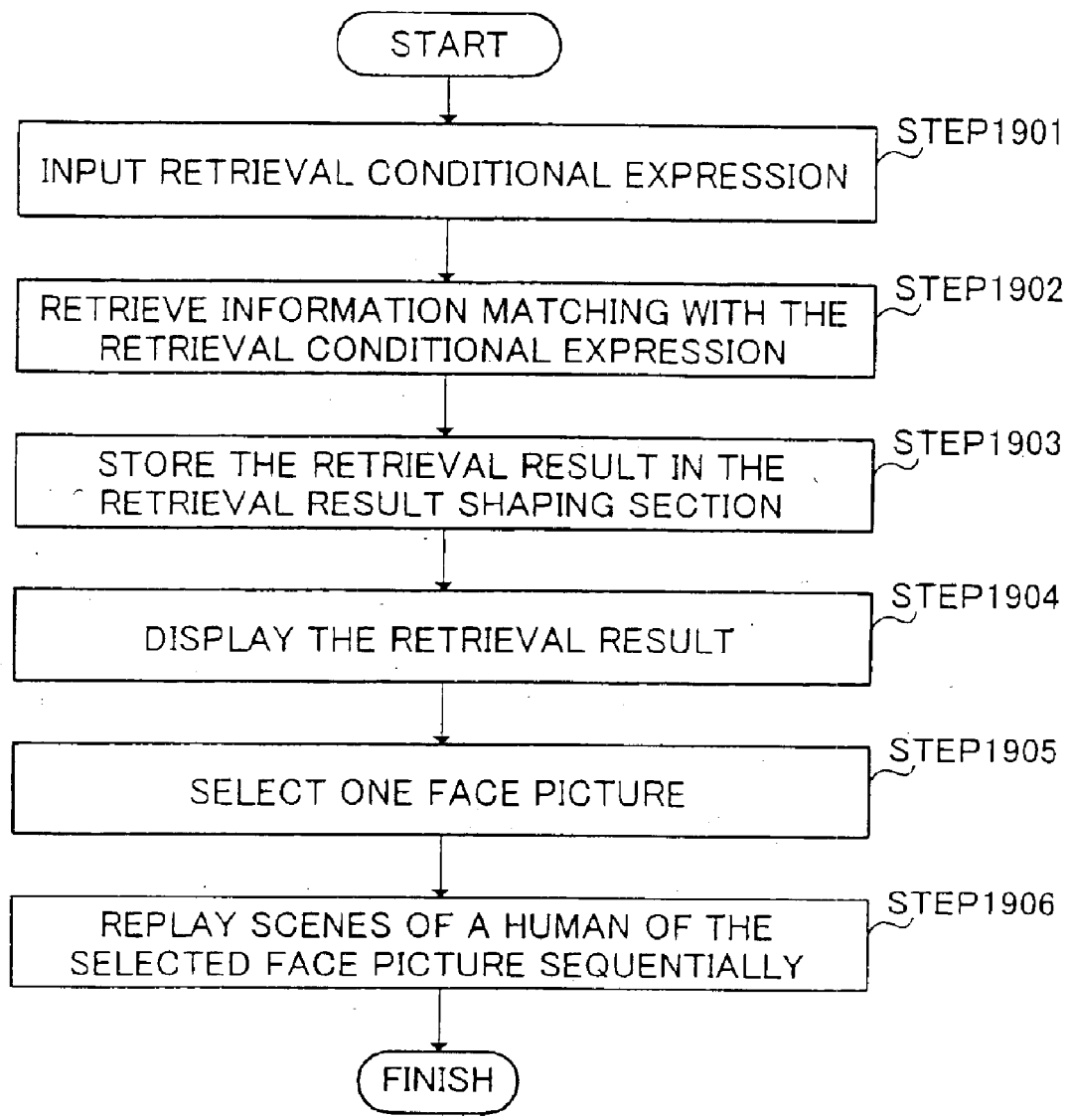
FIG. 19 is a flowchart indicating the operation for retrieving a human image in the moving picture retrieval apparatus in the sixth embodiment of the present invention.

The operation for retrieving a face picture using the retrieval section will be explained next using the flowchart in FIG. 19.

At step 1901, a user inputs a retrieval conditional expression using input section 1712.

At step 1902, retrieval section 1713 reads the retrieval conditional expression, and retrieves information matching with the retrieval conditional expression from the moving picture information files stored in face information storage section 1711. Then, the section 1713 outputs data on the face (sex, age and the time of the frame picture with the face existing thereon) and a picture of the face area (face picture) as the retrieval result signal. For example, when the retrieval conditional expression is indicative of "male", the section 1713 outputs all the face pictures estimated to be a male face and respective data on the face pictures as the retrieval result signal.

At step 1903, retrieval result shaping section 1716 stores the retrieval result signal 1715.

At step 1904, retrieval result shaping section 1716 performs the shaping to the retrieval result so as to enable the user to understand readily, and displays the resultant on the display section. For example, the section 1716 displays the face pictures and their sex and ages contained in the retrieval result signal.

At step 1905, the user selects one from the face pictures using input section 1712. The selected result is input to retrieval result shaping section 1716 as the picture selected signal.

At step 1906, retrieval result shaping section 1716 replays scenes of the human of the face picture selected at the step 1905 sequentially, while controlling replay section 1718.

While face feature detecting section 1705 detects an eye-interval area in the above explanation, it may be possible to detect other areas such as of a nose, ear and/or mouth, and to determine a face area in the face determining section so that the face area includes the detected areas.

According to this embodiment, since the eye-interval area varies little due to the expression of the face and whole movement of the head and is spaced away from the mouth and mustache, the eye-interval area is immune to a variation in face due to the expression of the face including eyes and mouth motions, presence or absence of mustache and/or whole movement of the head, and therefore using the eye-interval area enables a face area to be detected. Further, it is possible to retrieve a moving picture using the information on a person or face as a key, and to generate and store information for the retrieval.

(Seventh Embodiment)

Figure 20:
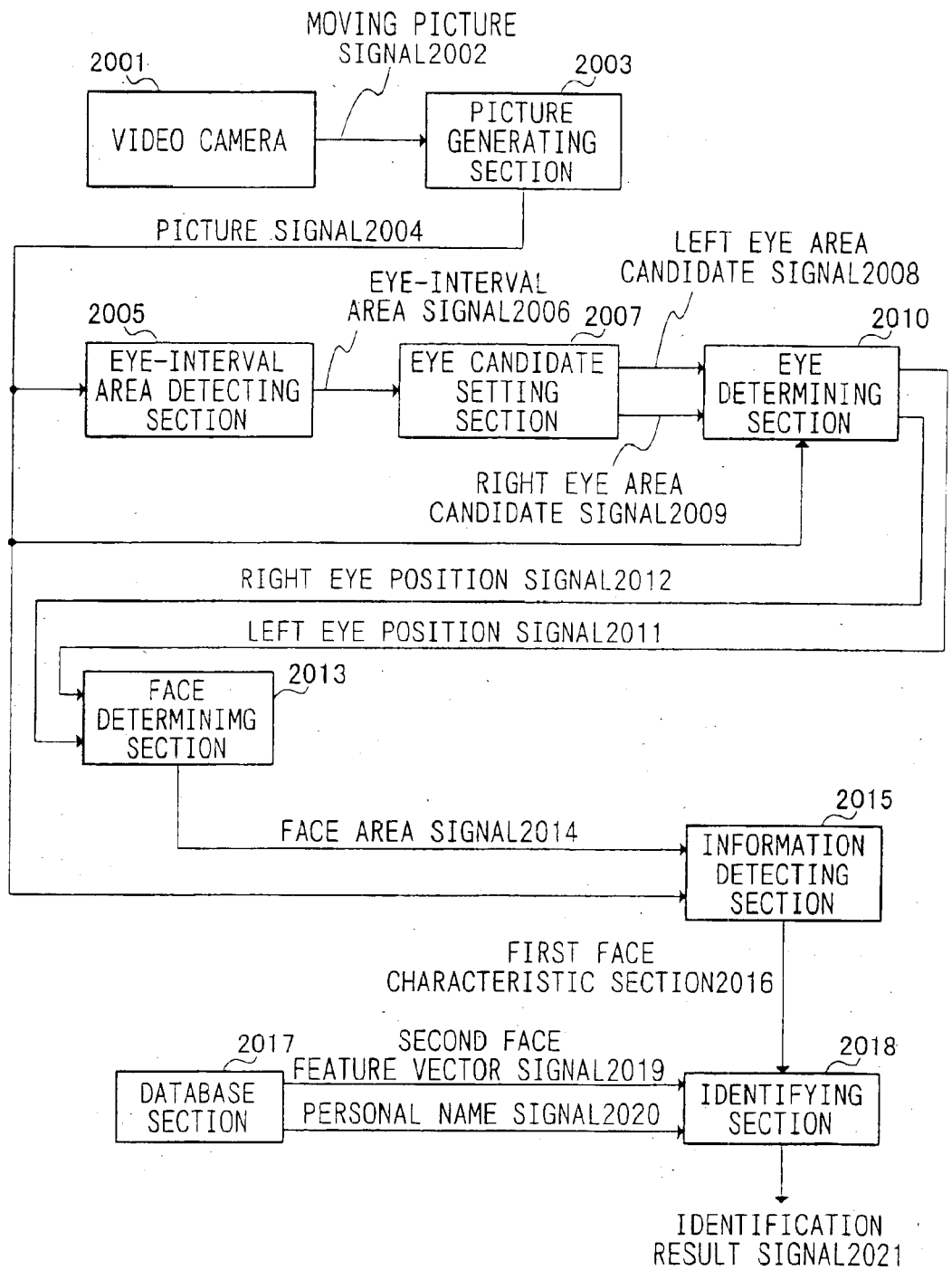
FIG. 20 is a diagram illustrating a schematic configuration of a face identifying apparatus in a seventh embodiment of the present invention.
Figure 21:
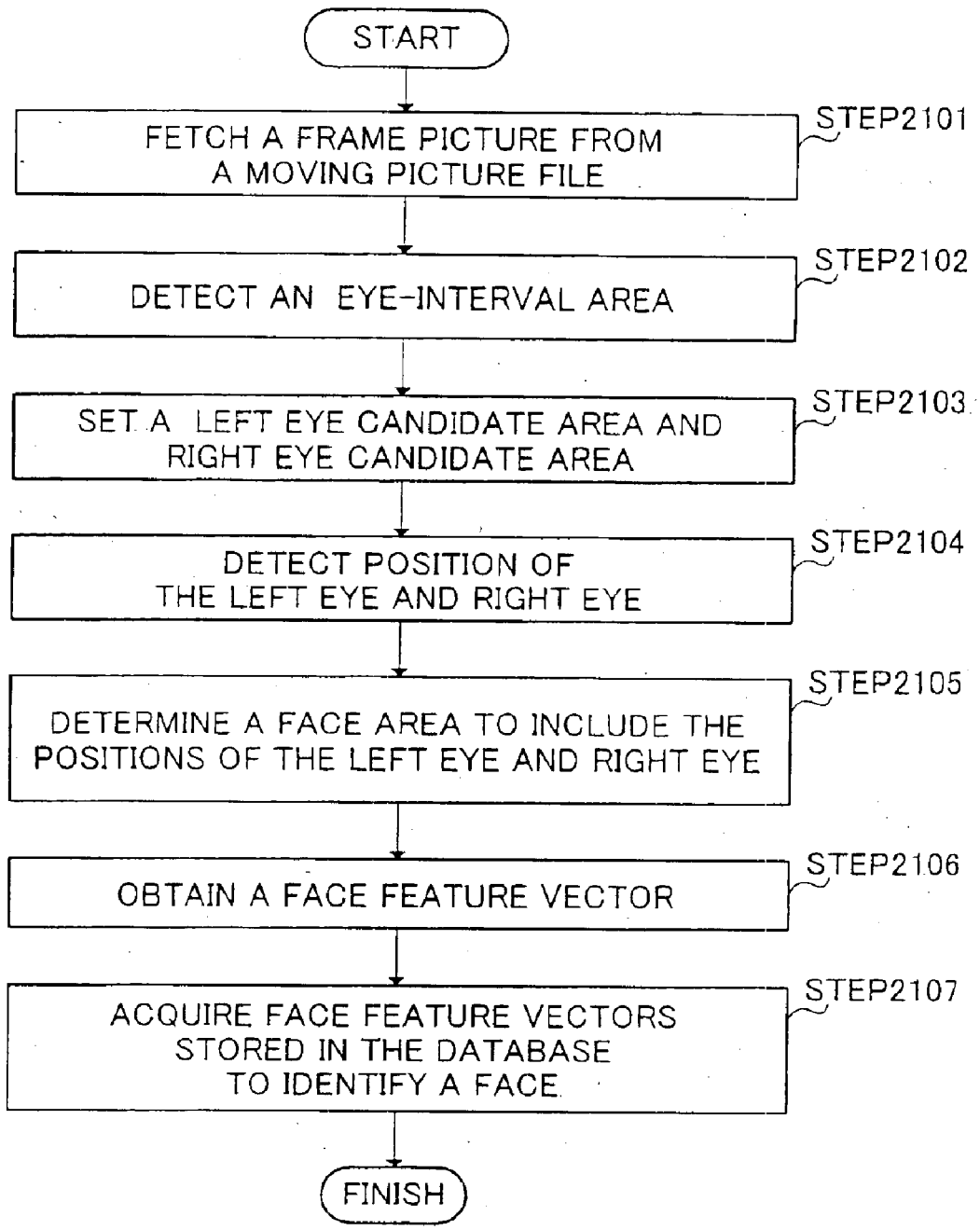
FIG. 21 is a flowchart indicating the operation of the face identifying apparatus in the seventh embodiment of the present invention.
Figure 22:
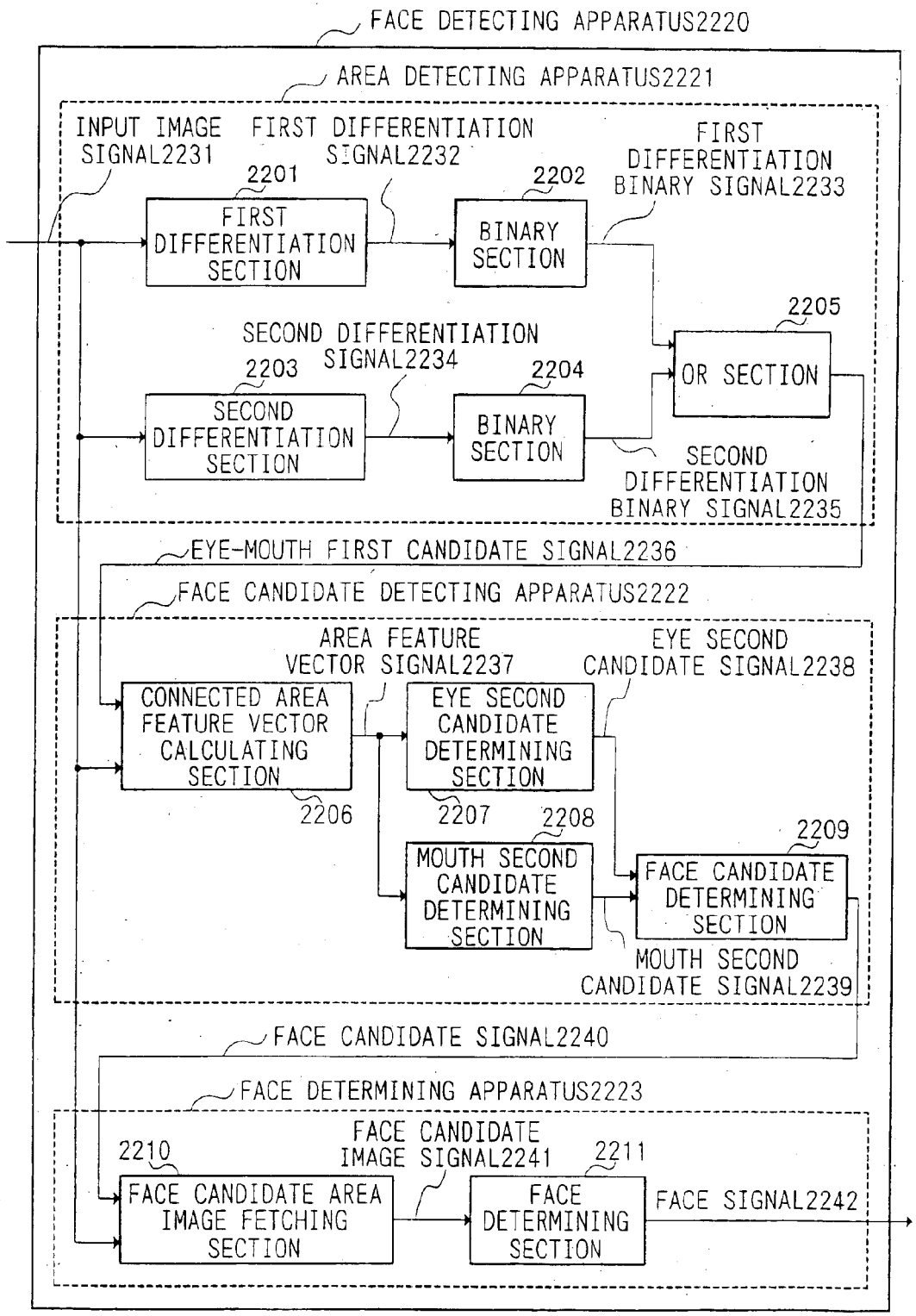
FIG. 22 is a diagram illustrating a schematic configuration of a face detecting apparatus.

FIG. 20 is a diagram illustrating a schematic configuration of a face identifying apparatus in the seventh embodiment of the present invention. The face identifying apparatus registers in advance ID cards of many people and their face pictures obtained by an image scanner or the like with a database, and identifies whether a person of a face picture taken in a video camera corresponds to somebody in the database or which registered ID card has a picture that is the most similar to such a person.

In FIG. 20, video camera 2001 outputs a moving picture of an area to be monitored such as a doorway of a room as a moving picture signal 2002. Picture generating section 2003 reads the moving picture signal 2002, and outputs a picture signal 2004 indicative of a frame picture.

Eye-interval area detecting section 2005 reads the picture signal 2004 to detect an eye-interval area, and outputs coordinates of the eye-interval area as an eye-interval area signal 2006.

Eye candidate setting section 2007 reads the eye-interval area signal 2006, sets an eye candidate area on each of the right and left sides of the eye-interval area, and thereby outputs a left eye area candidate signal 2008 and a right eye area candidate signal 2009.

Eye determining section 2010 fetches images of areas indicated by the left eye area candidate signal 2008 and right eye area candidate signal 2009 from the whole picture input by the picture signal 2004, examines the luminance characteristic or shape characteristic of each image to determine a position of a right eye and a position of a left eye, and thereby outputs a left eye position signal 2011 and right eye position signal 2012.

Face determining section 2013 reads the left eye position signal 2011 and right eye position signal 2012, and outputs a face area signal 2014 indicative of coordinates of the face area.

Information detecting section 2015 reads the face area signal 2014 and picture signal 2004, obtains a feature vector of a face from an image of the face area, and thereby outputs a first face feature vector signal 2016.

Database section 2017 stores the face feature vectors, names and the like of persons to be identified.

Identifying section 2018 reads a second face feature vector signal 2019 indicative of the face feature vector and a personal name signal 2020 indicative of a personal name from database section 2017, performs the face identification using the second face feature vector signal 2019 and the first face feature vector signal 2016 output from information detecting section 2015, and thereby outputs an identification result signal 2021.

For example, eye-interval area detecting section 2005, eye candidate setting section 2007, eye determining section 2010 and face determining section 2013 may have respectively the same configuration as the eye-interval area detecting section 1103, eye candidate setting section 1105, eye determining section 1108 and face determining section 1111 illustrated in the fourth embodiment.

The operation of the face identifying apparatus will be explained below using the flowchart in FIG. 20. In addition, it is assumed that video camera 2001 is disposed at, for example, a doorway of a room, and that the moving picture signal 2002 indicative of moving pictures taken by the video camera is successively input to picture generating section 2003.

At step 2101, image generating section 2003 fetches a frame of a picture from the moving picture signal 2002 to output as the picture signal 2004.

At step 2102, in the similar way to the step 1301 in the fourth embodiment, eye-interval area detecting section 2005 reads the picture signal 2004 to detect an eye-interval area, and outputs coordinates of the eye-interval area as the eye-interval area signal 2006.

At step 2103, in the similar way to the step 1302 in the fourth embodiment, eye candidate setting section 2007 reads the upper-left coordinate (xli,yti) and lower-right coordinate (xri,ybi) of the eye-interval area from the eye-interval area signal 206. Then, the section 2007 sets the upper-left coordinate (xll,ytl) and lower-right coordinate (xrl,ybl) of a left eye candidate area and the upper-left coordinate (xlr,ytr) and lower-right coordinate (xrr,ybr) of a right eye candidate area, and outputs the coordinates of the left eye candidate area as the left eye area candidate signal 2008 and the coordinates of the right eye candidate area as the right eye area candidate signal 2009.

At step 2104, eye determining section 2010 fetches images of areas indicated by the left eye area candidate signal 2008 and right eye area candidate signal 2009 from the whole picture input by the picture signal 2004, examines the luminance characteristic or shape characteristic of each image to determine a position of a right eye and a position of a left eye, and thereby outputs the left eye position signal

2011 and right eye position signal 2012. For example, the operation of the steps 1303 to 1310 in the fourth embodiment may be performed.

At step 2105, in the similar way to the step 1311 in the fourth embodiment, face determining section 2103 reads the left eye position signal 2011 and the right eye position signal 2012, and outputs the face area signal 2014 indicative of coordinates of a face area.

At step 2016, information detecting section 2015 reads the face area signal 2014 and picture signal 2004, obtains the face feature vector from an image of the face area, and thereby outputs the first face feature vector signal 2016. As a method of obtaining a feature vector of a face, it is possible to use a method disclosed in Japanese Laid Open Patent Publication HEI11-295058. In this method, face pictures of persons to be identified taken by a video camera are set as a set A1 (video face picture), and face pictures of ID cards obtained by an image scanner that scans the ID cards each with a picture of a person to be identified thereon are set as a set B1 (ID card picture), in advance. The set A1 and set B1 are respectively converted into a pattern A and pattern B each with face picture data as a one dimensional data sequence, and the feature extraction matrix for the set A1 and the feature extraction matrix for the set B1 are calculated by the learning. Then, the feature extraction matrix for the set A1 is applied to the picture data of a face area, whereby the feature vector of the face is obtained.

At step 2107, identifying section 2018 reads the second face feature vector signal 2019 indicative of the feature vectors of all the faces stored in database section 2017, and selects the face feature vectors similar to the first face feature vector signal 2016. Then, the section 2018 reads a name of a person having the most similar face feature vector from the database section, and outputs the name as the identification result signal 2021. The face feature vectors to be stored in the database section are obtained in advance by applying the feature extraction matrix for the set B1 to the face picture set B1.

According to this embodiment, since an area of an interval between eyes varies little due to the expression of the face and is paced away from the mouth, mustache and so on, the area is hardly affected by variations in face due to the expression of the face including eyes and mouth motions, the presence or absence of mustache or the like, and/or hairstyle, and therefore using the area, it is possible to detect an area of a face and to identify the face with high accuracy.

As described above, according to the present invention, candidate areas for eyes and candidate areas for an interval between eyes are detected from an image, an area of the interval between eyes is determined from the positional relationship between the candidate areas for eyes and the candidate areas for the interval between eyes, and areas of eyes and of a face are determined so that these areas include the area of the interval between eyes. Further, an area of an interval between eyes varies little due to the expression of the face and is spaced away from the mouth, mustache and so on, whereby the area is immune to variations in face due to the expression of the face including eyes and mouth motions, and to the presence or absence of mustache or the like, and therefore using the area of an interval between eyes enables information such as a human face area to be detected.

Further, the image/picture is first divided into small areas, and it is determined whether the small area is of an eye or of an interval between eyes, instead of determining whether a plurality of pixels is of connected areas, whereby it is possible to execute the detecting processing with a small calculation amount.

Furthermore, an area of an interval between eyes is determined by examining the overlap of the area of an interval between eyes and judging features in candidate areas for an interval between eyes and in candidate areas for eyes, whereby it is possible to suppress the incorrect detection of an area of a human face with a small calculation amount and to detect a human face with high accuracy, also when many background objects are taken in an image/picture besides a human face.

In the above explanation, the program is executed by a computer, whereby the processing is achieved that detects candidate areas for eyes and candidate areas for an interval between eyes from luminance characteristics of an input image, further detects an area of the interval between eyes from the positional relationship between the candidate areas for eyes and the candidate areas for the interval between eyes, and that determines a face area from the detected area of the interval between eyes. Such a program may be stored in a storage medium to be sold and used, or may be distributed via an information communication channel. Further, it may be possible to generate a program that detects an area of an interval between eyes from luminance characteristics of an input image, sets candidate areas for both eyes to include the area of the interval between eyes, examines the luminance characteristics or shape characteristics of the candidate areas for both eyes to determine a position of a right eye and a position of a left eye, determines a face area so that such an area includes the position of the right eye and the position of the left eye, and that outputs the determined face area. Then, such a program may be stored in a storage medium to be sold, or may be distributed via an information communication channel. Furthermore, it may be possible to generate a program that detects a face area from a frame picture of moving pictures by the above-mentioned human face detecting method, further detects information on a face in each detected area to store, and that retrieves a moving picture using the information on the face. Then, such a program may be stored in a storage medium to be sold, or may be distributed via an information communication channel. Still furthermore, it may be possible to generate a program that detects a face area by the above-mentioned human face detecting method, and that identifies a face using the feature vector of a face in each detected area and the feature vectors of faces stored in a database in advance. Then, such a program may be stored in a storage medium to be sold, or may be distributed via an information communication channel.

This application is based on the Japanese Patent Application No.2000-023680 filed on Feb. 1, 2000, entire content of which is expressly incorporated by reference herein.

What is claimed is:

1. A detecting method for detecting a human face from an input image, comprising:

detecting at least first and second candidate eye areas for first and second eyes and a plurality of candidate interval areas for an interval between the first and second eyes based on luminance characteristics of the input image;

determining whether a candidate interval area among the plurality of candidate interval areas is between the first and second candidate eye areas;

designating the candidate interval area as the interval between the first and second eyes when the candidate interval area is determined to be between the first and second candidate eye areas; and determining a face area based on the designated interval between the first and second eyes.

2. The method according to claim 1, wherein the first and second candidate eye areas are detected from the luminance characteristics corresponding to a first plurality of portions of the input image having a substantially horizontal alignment and a second plurality of portions of the input image having a substantially vertical alignment, and wherein there are fewer of the second plurality of portions than of the first plurality of portions.

3. The method according to claim 1, wherein the candidate interval areas are detected based on the luminance characteristics corresponding to a plurality of areas of the input image having fewer substantially horizontal portions and substantially vertical portions than a threshold amount.

4. The method according to claim 1, further comprising:

dividing at least a part of the input image into a plurality of sub areas, including the first and second candidate eye areas and the candidate interval areas.

5. The method according to claim 4, wherein the candidate eye areas are detected using edge information of a plurality of pixels in the sub areas.

6. The method according to claim 4, wherein the candidate eve areas are detected by obtaining a luminance histogram of a plurality of pixels in each of the sub areas, and comparing the luminance histogram between adjacent sub areas.

7. The method according to claim 4, wherein the candidate interval areas are detected using edge information of a plurality of pixels in the sub areas.

8. The method according to claim 7, wherein the candidate interval areas are detected using the edge information of the pixels in the sub areas adjacent each other in a vertical direction.

9. The method according claim 4, wherein the candidate interval areas are detected by obtaining a luminance histogram of a plurality of pixels in each of the sub areas, and comparing the luminance histogram between adjacent small areas.

10. The method according to claim 1, wherein information of a face in the face area is detected.

11. The method according to claim 10, wherein the information of the face includes at least one of a sex and an age.

12. A moving picture retrieval method, comprising:

detecting the face area using the method according to claim 1 from a frame picture of a moving picture;

storing information of a face in each area; and retrieving a moving picture using the information on the face.

13. A face identifying method for identifying a face, comprising:

detecting the face area using the method according to claim 1; and identifying a face using a feature vector of a face in each area and feature vectors of faces stored in a database.

14. A detecting method for detecting a human face from an input image, comprising:

detecting a plurality of candidate eye areas for first and second eyes based on luminance characteristics of the input image;

detecting an interval between the first and second eyes;

examining one of luminance characteristics and shape characteristics of the candidate eye areas for the first and second eyes to determine a position of a right eye and a position of a left eye; and determining a face area including the position of the right eye and the position of the left eye.

15. A detecting apparatus for detecting a human face from an input image, comprising:

an eye candidate detecting section configured to detect an interval between a plurality of candidate eye areas for first and second eyes based on a plurality of luminance characteristics of the input image;

an interval detecting section configured to detect an interval between the first and second eyes;

an eye determining section configured to examine one of luminance characteristics and shape characteristics of the candidate eye areas for the first and second eyes detected by said eye candidate detecting section to determine a position of a right eye and a position of a left eye; and a face determining section configured to determine a face area including the position of the right eye and the position of the left eye determined by said eye determining section.

16. A computer readable storage medium storing a detecting program for detecting a human face from an image, said detecting program configured to cause a computer to perform at least:

detecting at least first and second candidate eye areas for first and second eyes and a plurality of candidate interval areas for an interval between the first and second eyes based on luminance characteristics of the input image;

determining whether a candidate interval area among the plurality of candidate interval areas is between the first and second candidate eye areas;

designating the candidate interval area as the interval between the first and second eyes when the candidate interval area is determined to be between the first and second candidate eye areas; and determining a face area based on the designated interval between the first and second eyes.

17. A computer readable storage medium storing a detecting program for detecting a human face from an image, said program configured to cause a computer to perform at least:

detecting a plurality of candidate eye areas for first and second eyes based on a plurality of luminance characteristics of the image;

detecting an interval between the first and second eyes;

examining one of luminance characteristics and shape characteristics of the candidate areas for both eyes to determine a position of a right eye and a position of a left eye; and determining a face area including the position of the right eye and the position of the left eye.

18. A computer readable storage medium storing a motion picture retrieval program, said motion picture retrieval program configured to cause a computer to perform at least:

detecting at least first and second candidate eye areas for first and second eyes and a plurality of candidate interval areas for an interval between the first and second eyes based on a plurality of luminance characteristics of a frame picture of a motion picture;

determining whether a candidate interval area among the plurality of candidate interval areas is between the first and second candidate eye areas;

designating the candidate interval area as the interval between the first and second eyes when the candidate interval area is determined to be between the first and second candidate eye areas;

determining a face area based on the designated interval between the first and second eyes;

storing information of a face in the face area; and retrieving a motion picture using the information of the face.

19. A computer readable storage medium storing a face identifying program, said program configured to cause a computer to perform at least:

detecting at least first and second candidate eye areas for first and second eyes and a plurality of candidate interval areas for an interval between the first and second eyes based on a plurality of luminance characteristics of an image;

determining whether a candidate interval area among the plurality of candidate interval areas is between the first and second candidate eye areas;

designating the candidate interval area as the interval between the first and second eyes when the candidate interval area is determined to be between the first and second candidate eye areas;

determining a face area based on the designated interval between the first and second eyes; and identifying a face using a feature vector of the face extracted from the face area compared with a plurality of feature vectors of faces stored in a database.

* * * * *